United States Patent
Kim et al.

(10) Patent No.: US 7,749,469 B2
(45) Date of Patent: Jul. 6, 2010

(54) PROCESS FOR RECOVERING ISOLATED URANIUM FROM SPENT NUCLEAR FUEL USING A HIGHLY ALKALINE CARBONATE SOLUTION

(75) Inventors: Kwang Wook Kim, Daejeon (KR); Eil Hee Lee, Daejeon (KR); Dong Young Chung, Daejeon (KR); Han Bum Yang, Daejeon (KR); Jae Kwan Lim, Daejeon (KR); Kee Soo Cho, Daejeon (KR); Kee Chan Song, Daejeon (KR); Kyu Seok Song, Daejeon (KR); Kwang Yong Jee, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 0 days.

(21) Appl. No.: 12/337,559

(22) Filed: Dec. 17, 2008

(65) Prior Publication Data

US 2009/0269261 A1  Oct. 29, 2009

(30) Foreign Application Priority Data

Apr. 25, 2008  (KR) .................. 10-2008-0038599

(51) Int. Cl.
  *C01G 1/02*  (2006.01)
(52) U.S. Cl. ............... 423/16; 205/560; 205/703; 205/770; 423/17; 423/50; 423/184; 423/189
(58) Field of Classification Search .......... 423/16, 423/17, 50, 184, 189; 205/560, 703, 770, 205/353
See application file for complete search history.

(56) References Cited

U.S. PATENT DOCUMENTS

| | | | | |
|---|---|---|---|---|
| 2,759,789 A | * | 8/1956 | Spiegler ............... | 423/16 |
| 3,762,133 A | * | 10/1973 | Merriman et al. ....... | 95/163 |
| 4,305,911 A | | 12/1981 | Berger | |
| 4,320,923 A | * | 3/1982 | Lawes et al. .......... | 299/5 |
| 4,410,487 A | | 10/1983 | Tautz et al. | |
| 4,410,497 A | | 10/1983 | Otto, Jr. | |
| 4,436,704 A | | 3/1984 | Krennrich et al. | |
| 4,460,547 A | | 7/1984 | Sameh et al. | |
| 4,647,440 A | * | 3/1987 | Blasius et al. .......... | 423/181 |

(Continued)

FOREIGN PATENT DOCUMENTS

JP  09-113681  5/1997

OTHER PUBLICATIONS

English-language abstract for: Hiroshi, T. et al., JP 09-113681, Patent Abstracts of Japan (1997) (listed on accompanying PTO/SB/08A as document FP1).

(Continued)

*Primary Examiner*—Melvin C Mayes
*Assistant Examiner*—Melissa Stalder
(74) *Attorney, Agent, or Firm*—Sterne, Kessler, Goldstein & Fox P.L.L.C.

(57) ABSTRACT

Disclosed is a process for recovery of uranium from a spent nuclear fuel using a carbonate solution, characterized by excellent proliferation resistance of preventing leaching of transuranium element (TRU) nuclides such as Pu, Np, Am, Cm, etc. from the spent nuclear fuel as well as environmental friendliness of minimizing waste generation, wherein a highly alkaline carbonate solution is used to separate uranium alone from the spent nuclear fuel.

18 Claims, 15 Drawing Sheets

U.S. PATENT DOCUMENTS

| | | |
|---|---|---|
| 4,675,166 A | 6/1987 | Joubert |
| 4,696,768 A | 9/1987 | Ali et al. |
| 4,894,209 A * | 1/1990 | Moret et al. ............... 423/15 |
| 5,322,644 A * | 6/1994 | Dunn et al. ................. 588/7 |
| 5,384,104 A | 1/1995 | Noe |
| 5,640,668 A | 6/1997 | Krot et al. |
| 6,056,865 A * | 5/2000 | Amamoto et al. .......... 205/353 |
| 6,471,922 B1 | 10/2002 | Hsu et al. |

OTHER PUBLICATIONS

Asanuma, N. et al., "Anodic Dissolution of $UO_2$ Pellet Containing Simulated Fission Products in Ammonium Carbonate Solution," *J. Nucl. Sci. Technol.* 43:255 (2006) Atomic Energy Society of Japan.

Del Cul, G.D. et al., "Evaluation of Process That Might Lead to Separation of Actinides in Waste Storage Tanks Under Alkaline Conditions," *Sep. Sci. Technol.* 35:2127 (2000) Marcel Dekker, Inc.

* cited by examiner

A: $Am_2O_3 + 2H^+ + 2e^- = AmO_3$
B: $H_2O_2 + 2H^+ + 2e^- = 2H_2O$ : pH<11.6
C: $HO_2 + 3H^+ + 2e^- = 2H_2O$ : pH>11.6
D: $AmO_2 + 2H^+ + 2e^- = Am_2O_3$
E: $PuO_3 + 2H^+ + 2e^- = PuO_2$
F: $Np_2O_3 + 2H^+ + 2e^- = NpO_3$
G: $NpO_2 + 2H^+ + 2e^- = Np_2O_3$
H: $O_2 + 4H^+ + 4e^- = 2H_2O$
I: $O_2 + 2H^+ + 2e^- = H_2O_2$ : pH<11.6
J: $O_2 + 2H^+ + 2e^- = HO_2$ : pH<11.6

For Acid Precipitation of U Solution

For Electrolytic Precipitation of U Solution

PROCESS FOR RECOVERING ISOLATED URANIUM FROM SPENT NUCLEAR FUEL USING A HIGHLY ALKALINE CARBONATE SOLUTION

CROSS REFERENCE TO RELATED APPLICATIONS

This application claims priority to Korean Patent Application No. 10-2008-0038599, filed on 25 Apr. 2008 in the Korean Intellectual Property Office, the disclosure of which is incorporated herein by reference in its entirety.

BACKGROUND OF THE INVENTION

1. Field of the Invention

The present invention relates to a process for recovery of uranium (U) from a spent nuclear fuel using a highly alkaline carbonate solution and, more particularly, to a process for recovery of uranium alone (i.e., in isolation) from a spent nuclear fuel using a highly alkaline carbonate solution, characterized by excellent proliferation resistance that prevents dissolution-leaching of transuranium element ("TRU") nuclides such as plutonium (Pu), neptunium (Np), americium (Am), curium (Cm), etc., from the spent nuclear fuel, as well as providing ecologically-friendly ("eco-friendly") characteristics that minimize waste generation.

2. Description of the Related Art

Recently, global warming due to accelerated fossil energy consumption and an increase in environmental hazards caused there from, as well as the depletion of natural resources (e.g., oil) have triggered intense international research and development in order to ensure access to a stable supply of environmentally clean energy. To date, research and proposals in the area of next-generation nuclear fuel cycle management have resulted in a generation-IV ("GEN-IV") concept, which was introduced by the International Atomic Energy Agency ("IAEA") in 2001; an Advanced Fuel Cycle Initiative ("AFCI"), which was introduced in 2003; as well as a Global Nuclear Energy Partnership ("GNEP"), which introduced in 2006 by the U.S. Department of Energy ("the DOE"). Such programs focus on nuclear sustainability, proliferation resistance, system stability, system reliability, and attempt to minimize the environmental impact of nuclear reactors by effective recycling of valuable elements in the spent nuclear fuel.

GEN-IV and GNEP focus on minimizing waste, proliferation, and environmental impact recycling or disposing spent nuclear fuel using a wet and/or a dry treatment process(es). A wet process typically utilizes one or more solvent extractions after dissolution of the spent nuclear fuel in a strong acid, which separate and treat the nuclides in the spent nuclear fuel according to different purposes. On the other hand, a dry process typically uses electrolytic treatment of the spent nuclear fuel in a molten salt.

The Plutonium-Uranium Extraction process ("PUREX") is representative of wet process methods that can separate U and Pu with high purity. However, PUREX has a critical defect for proliferation resistance because excessive waste is generated by this wet process. Therefore, PUREX belongs to spent nuclear fuel treatment concepts that must be avoided in views of the advanced nuclear fuel cycle.

Recently, U.S. AFCI reports disclosed a Uranium Extraction Plus process ("UREX+"), which is an advanced wet process that will be applied in GNEP programs. In the UREX+ process, radioactive toxicities are removed from spent fuel to provide high-purity U having toxicity comparable to naturally occurring U that is separated from the spent nuclear fuel. Such low toxicity U can, in turn produce a low level (radioactive) waste and can allow for near-surface disposal and/or containment. In the UREX+ process, since Pu is not separated alone but is maintained in mixture with TRU and/or fission product ("FP"), the process is considered to have favorable proliferation resistance.

As for GNEP, a number of studies have attempted to separate a series of TRU nuclides based on their chemical properties via solvent extraction by applying advanced UREX+ II, III and/or IV programs, in order to reuse the spent nuclear fuel and minimize high level waste generation, thereby considerably improving ability of a site for radioactive waste disposal. A variety of wet processes studied first in the EU and Japan substantially adopt the solvent extraction with high separation efficiency in order to minimize waste generation and reuse (or recycle) useful nuclides contained in the spent nuclear fuel.

As one of the dry processes for spent nuclear fuel, a PYRO-metallurgy ("PYREX") process is used to separate U, TRU, rare earths (RE), etc. from spent nuclear fuel in a LiCl or LiF molten salt at a temperature of 500° C. or more using a series of electrolysis steps. Such processes have been reported in Japan, Russia and the U.S. since the 1960s, and require a high technical level for high purity separation of nuclides and favorable proliferation resistance because Pu is mixed with TRU or others and reacts with the same. Drawbacks to the PYREX process are high levels of waste, a need for corrosion resistant materials required for use in a hot molten salt atmosphere, a lack of practical technologies concerning the same, and the like.

In order to overcome problems in current dry processes used in the U.S., Japan, EU, etc., such as operation stability, development of anti-corrosive materials, high purity separation, and the like, extensive long term research and investigation into the concerned techniques are required. The U.S. has proposed to commercialize a wet separation process by 2015, while a dry separation technique is planned become commercially available after 2030. That is, development of a wet process currently takes precedence over the development of an improved dry process. Therefore, current research and development in most countries has focused on the use of wet processes to treat spent nuclear fuel and high level waste generated therefrom rather than dry processes.

Compared to dry processes, most wet processes can operate at lower temperature and can be operated continuously. However, wet processes generally exhibit reduced proliferation resistance, for example, because most organic solvent extractants exhibit extraction properties only in acidic atmospheres (to enable separation of Pu ions using a solvent extractant), and it is difficult to selectively dissolve elements from spent nuclear fuel in a strong acid solution (which is used for most wet processes).

Generally, the solvent extraction used in the above wet process is technologically similar to the solvent extraction used in PUREX, which is an example of the wet process for Pu separation. However, PUREX or UREX+, which are common wet processes that utilize solvent extraction, are substantially different from the present invention in terms of technical characteristics and purposes to be achieved. Although U.S. Pat. Nos. 4,410,487, 4,436,704, 4,460,547, 4,675,166 and 4,696,768 disclose processes for U separation in a carbonate solution, purposes, procedures, and conditions of the medium used in these patents are substantially different from those of the present invention. U.S. Pat. No. 5,640,668 describes a process for separating actinide elements such as Pu and Np under alkaline conditions. U.S. Pat. Nos. 4,410, 497 and 6,471,922 disclose a process for precipitating and separating U under alkaline conditions. U.S. Pat. No. 5,384,104 discloses a technique for recovering U from a radioactive waste using a carbonate solution. U.S. Pat. No. 4,305,911 proposes U recovery from U raw ores using an alkaline medium. Japanese Laid open Patent No. 1997-113681 and *J. Nucl. Sci. & Tech.* 43:255-262 (2006) disclose a process for treating a spent nuclear fuel using a carbonate system. However, none of the systems described in these various references provides a commercially reliable nuclear waste treatment system that can isolate U in an efficient manner.

SUMMARY OF THE INVENTION

Accordingly, the present invention provides a process for recovering isolated uranium (U) from a spent nuclear fuel using a highly alkaline carbonate solution, characterized by selectively separating and recovering U alone from the spent nuclear fuel while exhibiting high proliferation resistance and environmental friendliness of minimizing waste generation. The process of the present invention enhances the ability to dispose of spent nuclear fuel and provides a disposal capability that is 40 to 60 times more efficient than that of conventional methods. Furthermore, in some embodiments a recovered U-component can be reused and/or recycled.

In some embodiments, the present invention further provides a process for recovering isolated U from a spent nuclear fuel using a highly alkaline carbonate solution, characterized in that TRU nuclides, lanthanides, transition metal nuclides, and the like, are either substantially undissolved or then precipitated together as a mixed solid state from the spent nuclear fuel to provide high purity U separated from the spent nuclear fuel. In some embodiments, U separated from a spent nuclear fuel exhibits a natural U-like radioactive toxic level sufficient that the U separated by a process of the present invention can be disposed in a near-surface disposal site.

In some embodiments, the present invention provides a process for recovering isolated U from a spent nuclear fuel using a highly alkaline carbonate solution, characterized in that the isolated U is removed from the spent nuclear fuel to provide a product having a U content of about 95% or more, about 97% or more, about 99% or more, or about 99.9% or more.

In some embodiments, the present invention provides a process for recovering isolated U from a spent nuclear fuel using a highly alkaline carbonate solution, characterized in that U alone is selectively dissolved in the carbonate solution based on a difference in redox (reduction-oxidation) equilibrium potentials and difference in solubilities of nuclides.

In some embodiments, the present invention provides a process for recovering isolated U from a spent nuclear fuel using a highly alkaline carbonate solution, characterized in that: U alone is selectively oxidized in the carbonate solution at room temperature; and the oxidized U is dissolved in the form of carbonate complex ions while the remaining TRU nuclides and other fission products are mixed together to form an insoluble residue and/or hydroxide which in turn is settled and precipitated in the solution, thus effectively separating U.

In some embodiments, the present invention provides a process for separating and recovering U from a spent nuclear fuel using a highly alkaline carbonate solution, characterized in that U is precipitated by desirably adjusting pH of the carbonate solution to recover U in the form of $UO_4$; metal ion impurities are removed from the carbonate solution after U removal; and the remaining carbonate solution after removal of the impurities is recycled to the dissolution-leaching step of U in the spent nuclear fuel.

The following description will be given of various embodiments of the present invention.

The U recovery process according to the present invention includes a U dissolution-leaching step, wherein an oxidant (e.g., $H_2O_2$, $K_2S_2O_8$, NaOCl, and the like) having an oxidation potential between the redox equilibrium potential of $UO_2$ and the redox equilibrium potentials of plutonium oxide ($PuO_2$), neptunium oxide ($NpO_2$) and americium oxide ($AmO_2$) is utilized to selectively precipitate U from solution. In some embodiments, the oxidant is put into a dissolver containing a carbonate solution at a pH of about 11 to about 13 and $UO_2$ is dissolved from the spent nuclear fuel into the carbonate solution in the tank, whereas TRU oxides such as $PuO_2$, $NpO_2$, $AmO_2$, and the like are insoluble and do not dissolve in the carbonate solution. Dissolved U can be present in the carbonate solution in a complicated form of uranyl peroxo-carbonate complex ions having the formula $UO_2(O_2)_x(CO_3^{2-})_y^{2-2x-2y}$, wherein "2–2x–2y" is the net charge of the uranyl peroxo-carbonate complex.

In some embodiments, the carbonate solution comprises about 0.1 M to about 3 M, about 0.2 M to about 3 M, about 0.3 M to about 3 M, about 0.5 M to about 3 M, about 1 M to about 3 M, about 1.5 M to about 3 M, about 2 M to about 3 M, about 0.1 M to about 2.5 M, about 0.1 M to about 2 M, about 0.1 M to about 1.5 M, about 0.1 M to about 1 M, about 0.1 M to about 0.5 M, about 0.5 M to about 2.5 M, about 1 M to about 2 M, about 0.5 M, about 1 M, about 2 M, or about 3 M of a carbonate salt (e.g., $Na_2CO_3$, and the like).

In some embodiments, the carbonate solution further comprises an oxidant (e.g., $H_2O_2$, and the like) in a concentration of about 0.1 M to about 3 M, about 0.2 M to about 3 M, about 0.3 M to about 3 M, about 0.5 M to about 3 M, about 1 M to about 3 M, about 1.5 M to about 3 M, about 2 M to about 3 M, about 0.1 M to about 2.5 M, about 0.1 M to about 2 M, about 0.1 M to about 1.5 M, about 0.1 M to about 1 M, about 0.1 M to about 0.5 M, about 0.5 M to about 2.5 M, about 1 M to about 2 M, about 0.5 M, about 1 M, about 2 M, or about 3 M.

In some embodiments, the U recovery process of the present invention further comprises a Cesium-Technetium precipitation step, wherein at least one of: cesium (Cs), technetium (Tc), and the like, are separated from the U-containing carbonate solution. In this step, Cs, Tc, and the like can be precipitated using an organic precipitant. Organic precipitants suitable for use with the present invention include, but are not limited to, tetraphenyl borate (TPB), tetraphenyl phosphonium (TPP), and combinations thereof.

In some embodiments, the U recovery process of the present invention further comprises a U precipitation-carbonate recovery step, wherein an acid is added to the carbonate solution to precipitate U from the U-containing carbonate solution. In some embodiments, carbonate can be recovered from the U-containing solution simultaneous to precipitation of U. For example, by adjusting the pH of the U-containing carbonate solution to a pH of about 2 to about 4, uranyl peroxo-carbonate complex ions are decomposed in solution and precipitate as uranyl peroxide ($UO_4$). At the same time, carbonate ion ($CO_3^{2-}$) separated from the uranyl peroxo-carbonate complex and free carbonate ions present in the U-containing solution are converted into carbon dioxide in a gaseous state ($CO_2)_g$, and thus escape from the U-containing solution. The carbon dioxide can be captured and recycled as carbonate. For example, a gas absorption column having an alkaline solution (e.g., NaOH) circulated there through can be attached to a reaction vessel containing the U-containing carbonate solution, wherein the carbon dioxide gas is converted into the carbonate salt solution upon reacting with the alkaline solution.

In some embodiments, the pH of the U-containing carbonate solution can be adjusted by directly adding acid to the solution. In such embodiments, an alkaline solution flowing through a gas absorption column can be supplied from an electrodialysis unit described herein.

In some embodiments, the pH of the U-containing carbonate solution can be adjusted by introducing the U-containing carbonate solution into an anodic chamber in an electrolyzer having a cation exchange membrane wherein $H^+$ ions are generated by water splitting reaction at an anode. In such embodiments, an alkaline solution present in the gas absorption column (e.g., NaOH, LiOH, KOH, and the like) can be produced by cations (e.g., $Na^+$, $Li^+$, $K^+$, and the like) that move from the anodic chamber through the cation exchange membrane during electrolysis and hydroxyl ions generated by another water splitting reaction in the cathodic chamber.

In some embodiments, the U recovery process of the present invention further comprises an acid-alkali recovery step, wherein metal ion impurities such as molybdenum (Mo), tellurium (Te), and the like that can remain in the acidified carbonate solution after U has precipitated therefrom are removed by an electrodialysis unit using a cation exchange membrane and an anion exchange membrane and, at the same time, the acid and alkali solutions used in the U precipitation-carbonate recovery step are recovered, and recycled to the U-precipitation-carbonate recovery step.

As described above, an oxidant having an oxidation potential between a redox equilibrium potential of $UO_2$ and other redox equilibrium potentials of plutonium oxide ($PuO_2$), neptunium oxide ($NpO_2$), americium oxide ($AmO_2$), and the like, oxidizes and leaches U alone from the spent nuclear fuel in the form of carbonate complex ions having a valence charge of +6. However, TRU oxides such as Pu, Np, Am, Cm, and the like, are insoluble while most of fission products and/or nuclide oxides are also insoluble or, even if such products and/or nuclide oxides are partially soluble, these are precipitated by hydrolysis so as to be mixed with TRU oxides, and then, precipitated. Accordingly, since a path of separating Pu or Np alone is blocked during the U dissolution-leaching step form the spent nuclear fuel, the present inventive process can exhibit high proliferation resistance and need no use of acid during dissolving the spent nuclear fuel which is used in conventional wet process, thereby solving problems of corrosion in dissolution equipment in a wet process and considerably improving operation stability.

Not being bound by any particular theory, the U recovery process of the present invention does not adopt solvent extraction in order to treat the spent nuclear fuel. Therefore, the present invention has no technical similarity to existing wet processes such as PUREX, UREX, etc., which use solvent extraction techniques to be able to easily separate Pu. A novel technique developed by the present inventors can favorably enhance proliferation resistance and have beneficial features in that an enormous amount of organic waste liquid as a problem of the solvent extraction, is principally not generated. Accordingly, compared to the existing wet process using solvent extraction, the present invention can minimize waste generation, primarily eliminate fire possibility due to organic vapor caused by using organic solvent extractant, and use a precipitation apparatus based on pH control which is much simpler to use compared to a solvent extraction apparatus. Consequently, the technical idea proposed by the present invention can simplify working processes and enhance operation stability while minimizing waste generation.

After U recovery, the acid-alkali solution used for precipitating the carbonate solution as well as U during the present inventive process can be fully recovered and recycled by an electrochemical method, so that secondary waste is substantially not generated throughout the whole process and, even if the secondary waste is partially generated, an amount of the waste is greatly reduced. Therefore, the present inventive process can exhibit excellent environmental friendliness.

As is apparent from the above description, a combination of dissolution and leaching-precipitation and separation techniques carried out at room temperature in a carbonate solution according to the present invention can have excellent proliferation resistance and environmental friendliness, and can recover U alone with high purity sufficient to conduct a near-surface disposal thereof so that it can improve disposal capability of a site for high level radioactive waste and allow reuse of U as a major portion of the spent nuclear fuel when the spent nuclear fuel is under disposal, thereby playing an important part in management of spent nuclear fuel.

BRIEF DESCRIPTION OF THE DRAWINGS

These and other objects, features, aspects, and advantages of the present invention will be more fully described in the following detailed description of the embodiments and examples, taken in conjunction with the accompanying drawings. In the drawings.

Figure 1:
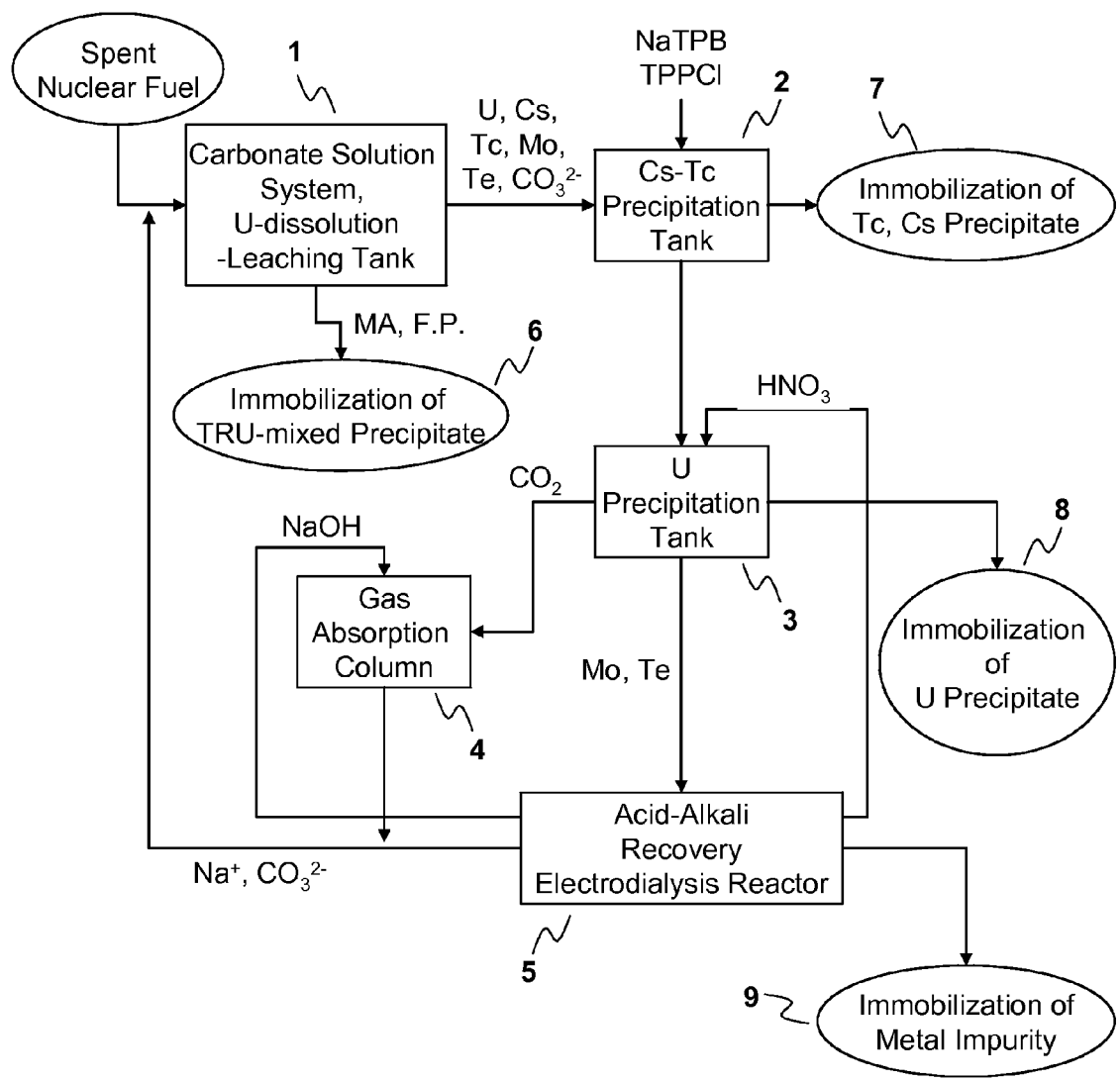
FIG. 1 is a flow diagram illustrating a process for recovery of U alone from a spent nuclear fuel using a highly alkaline carbonate solution according to the present invention.

Reference will now be made in detail to the embodiments of the present invention, examples of which are illustrated in the accompanying drawings.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

References to spatial descriptions (e.g., "above," "below," "up," "down," "top," "bottom," etc.) made herein are for purposes of description and illustration only, and should be interpreted as non-limiting upon the methods of the present invention, and catalysts prepared therefrom, and any products prepared using the catalysts, which can be spatially arranged in any orientation or manner.

A process for recovery of uranium (U) in a spent nuclear fuel according to the present invention comprises: using a carbonate solution having $H_2O_2$ as an oxidant to sediment or precipitate TRU nuclides and other fission products contained in the spent nuclear fuel in the forms of insoluble residues and/or hydroxides while selectively dissolution-leaching U only; separating Cs and Tc leached together with U from the spent nuclear fuel by desirable organic precipitants; acidifying the carbonate solution containing U so as to adjust pH of the solution and precipitate the U while converting carbon dioxide gas generated during the precipitation into a gas absorber wherein an alkaline solution flows down so as to recover the carbonate solution; and recovering the acid and alkali solutions, which were used in U precipitation and carbonate recovery steps, through electrodialysis, while separating metal ion impurities as the final residue.

More particularly, the present invention provides a process for U recovery comprising: a U dissolution-leaching step in that a spent nuclear fuel is placed in 0.1M to 3.0M carbonate solution ($M_2CO_3$: wherein M is, e.g., Na, Li, K, and the like) containing about 0.1 M to about 3 M of an oxidant (e.g., $H_2O_2$) at a pH of about 11 to about 13, wherein the oxidant has an oxidation potential that is between an equilibrium redox potential of $UO_2$ and an equilibrium redox potential of, e.g., $PuO_2$, $NpO_2$, $AmO_2$, and the like, wherein U alone among an actinide element present in the spent nuclear fuel is dissolved in the form of a U peroxo-carbonate complex having the formula $UO_2(O_2)_x(CO_3^{2-})_y{}^{2-2x-2y}$ with co-leached impurity elements as, e.g., Cs, Tc, Mo, Te, and combinations thereof, a Cs—Tc precipitation step in that Cs and/or Tc dissolved in the U-containing carbonate solution are selectively removed using an organic precipitant (e.g., NaTPB, TPPCl, and the like); a U precipitation-carbonate recovery step wherein an acid is added to the U-containing carbonate solution to adjust its pH to about 2 to about 4 so as to precipitate a U oxo compound in the form of $UO_4$, and flowing carbon dioxide gas generated during U precipitation into a gas absorption column, in which an alkaline solution (e.g, NaOH) flows through the column so as to recover the carbonate salt solution; and an acid-alkali recovery step in that impurity nuclides such as Mo and Te co-dissolved with U in the carbonate solution during U dissolution are separated and removed and the acid-alkali solution used in the U precipitation-carbonate recovery step is recovered through electrodialysis using a cation exchange membrane and an anion exchange membrane so as to remove and separate the remaining metal impurities.

The present inventive process further includes thermal treatment steps in that TRU nuclide and other nuclide based insoluble precipitates from the U dissolution leaching step, Cs and Tc precipitates from the Cs—Tc precipitation step, U separated from the U precipitation-carbonate recovery step, and the metal impurities from the acid-alkali recovery step are thermally treated and stabilized in the form of oxide.

Figure 15:
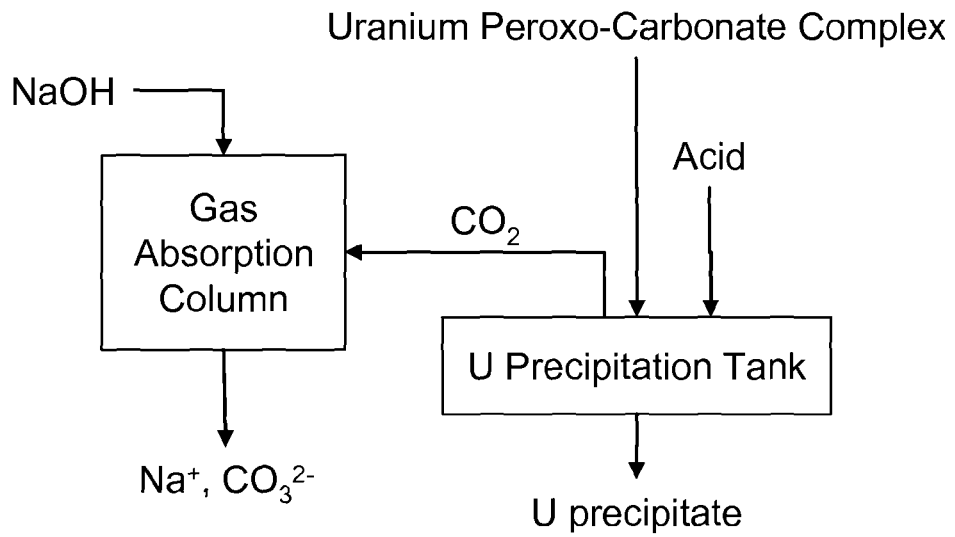
FIG. 15 is a flow diagram illustrating each of U precipitation-carbonate recovery by directly adding an acid to a U containing carbonate solution, or by an electrolytic method using introducing a U containing carbonate solution to an anodic chamber of an electrolyzer.
Figure 15:
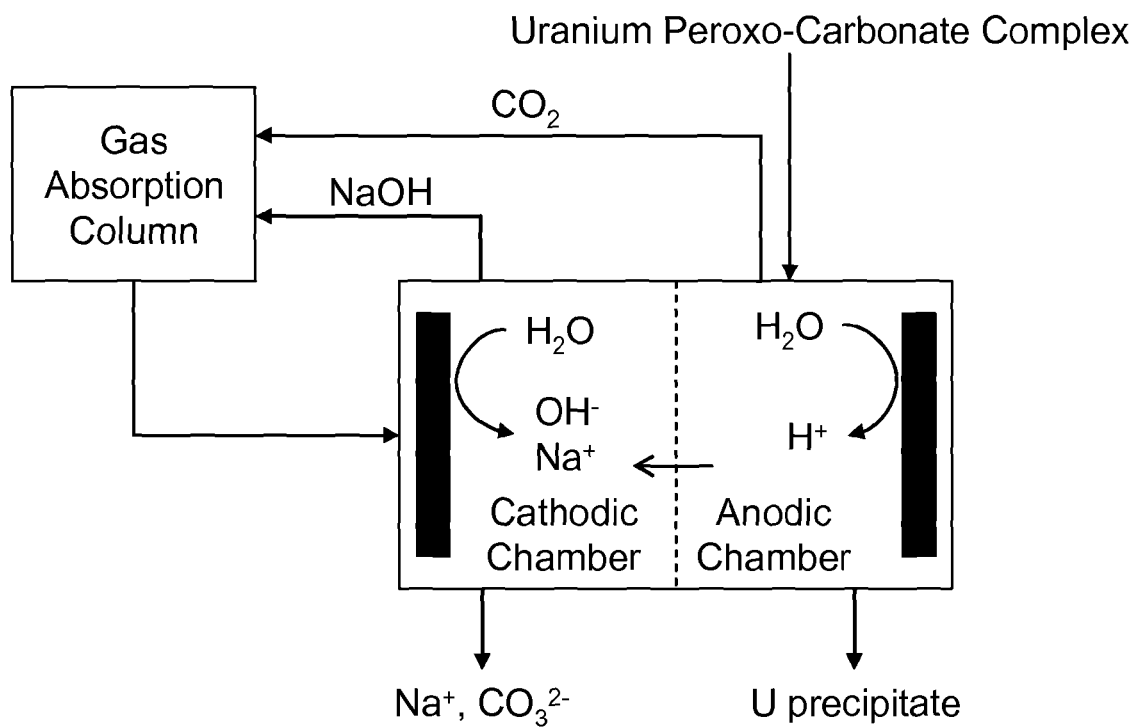

In order to adjust the pH of the U-containing carbonate solution during the U precipitation-carbonate recovery step, as illustrated in FIG. 15, an acid titration method for control of pH by directly adding an acid such as $HNO_3$ to the solution or an electrolytic titration method, which includes introducing the U containing carbonate solution to an anodic chamber of an electrolyzer having a cation exchange membrane and generating $H^+$ ions in the anion chamber through water splitting reaction, can be used to adjust pH of the carbonate solution.

When $H^+$ ions are fed into the carbonate solution, $CO_3^{2-}$ ions in the solution are converted into carbon dioxide to be discharged out of the solution. Such carbon dioxide gas can be recovered by directly adding an acid to the solution to cause precipitation of U. In this case, an output line for discharging carbon dioxide gas generated from a U precipitation tank is connected to a bottom part of a gas absorption column provided outside the U precipitation tank, while an alkaline solution such as NaOH is introduced into the gas absorption column (e.g., a top part of the gas absorption column) wherein the carbon dioxide gas is converted into a carbonate salt solution through gas-solid contact, so as to recover the carbonate salt solution. When an electrolyzer having a cation exchange membrane is used for U precipitation, a solution contained in a cathodic chamber is fed into a top end of the gas absorption column to circulate therein while a carbonate solution containing U is introduced to the anodic chamber such that the carbonate solution becomes acidic by $H^+$ ions generated at the anode through water splitting reaction and carbon dioxide gas is exhausted out of the anodic chamber. Following this, the discharged carbon dioxide gas flows into the bottom part of the gas absorption column connected to the cathodic chamber. In the anodic chamber, when $CO_3^{2-}$ ions are exhausted in the form of carbon dioxide gas, the remaining cations of the carbonate (for example, $Na^+$ if the carbonate solution is $Na_2CO_3$) are moved to the cathodic chamber through a cation exchange membrane, which in turn, can react with $OH^-$ ions generated by water splitting reaction at the cathode to spontaneously produce an alkaline solution (that is, NaOH) without external supply thereof. This cathodic solution flows into the top part of the gas absorption column to react with carbon dioxide gas discharged from the anodic chamber, thus again producing a carbonate salt solution (e.g., $Na_2CO_3$ solution) to be recovered. The carbonate solution in the anodic chamber change carbon dioxide gas to leave out of the solution and cations to move into the cathodic chamber which in turn escape out of the solution in the anodic chamber. Accordingly, electrical conductivity of the anodic solution is deteriorated to cause difficulty in electrolysis. In order to prevent such problem in electrical conductivity due to the depletion of ions in the solution, a supporting solution (for example, a sodium salt solution $NaNO_3$ or $Na_2SO_4$ solution if the carbonate solution is $Na_2CO_3$) containing the same cations as the carbonate solution is required to be introduced to the anodic chamber and be mixed with the carbonate solution. In the anodic chamber, more than +2 valence metal ions contained in the anodic solution (herein, U complex ions: Mo, Te, etc.) and anions used as a supporting electrolyte for the anodic solution cannot pass through the cation exchange membrane but remain in the anodic solution, thus being treated in the next step, that is, the acid-alkali recovery step.

The present invention will now be described in detail with reference to FIG. 1. FIG. 1 illustrates a process of separating U alone from a spent nuclear fuel with a high proliferation resistance and an excellent environmental friendliness according to the present invention, so as to reduce a volume of high level (radioactive) waste to be discarded. The disclosed process can be performed by an apparatus comprising: a U dissolution-leaching tank, 1, to oxidatively leach U alone from the spent nuclear fuel by using a carbonate solution containing $H_2O_2$; a Cs—Tc precipitation tank, 2, to precipitate and separate Cs and Tc as impurities co-dissolved with U in the U dissolution-leaching tank, 1; a U precipitation tank, 3, to precipitate and separate U using pH control; a gas absorption column, 4, for recovering the carbonate salt solution to be used in the U dissolution-leaching tank from carbon dioxide gas generated in the U precipitation tank; and an acid-alkali recovery electrodialysis reactor, 5, for recovering the acid and alkaline solutions used in the U precipitation tank, 3, and the gas absorption column 4. A mixture precipitate, 6, including TRU nuclides as an insoluble precipitate and other fission product nuclides precipitated in the U dissolution-leaching tank, 1, Cs—Tc organic precipitate, 7, precipitated in the Cs—Tc precipitation tank 2, and/or other impurity metal ions, 9, discharged from the acid-alkali recovery electrolyzer 5 can be subjected to a thermal treatment step for immobilization of the above materials in the form of oxide, and then, can be delivered to a site for low level waste disposal. Meanwhile, U precipitate, 8, recovered from the U precipitation tank, 3, can be subjected to the immobilization in the form of oxide, and then, can be delivered to a site for low level waste disposal or a further step for reuse of U.

Dissolution of Spent Nuclear Fuel

For explanation for the selective recovery of U alone from a spent nuclear fuel in a carbonate solution, dissolution mechanisms for nuclides included in the spent nuclear fuel and characteristics of aquatic chemistry in regard to solubility of such nuclides in a carbonate solution system should be understood. Chemical parameters relating to dissolution of the spent nuclear fuel can include, for example, oxidation characteristics of a solution to be contacted with the spent nuclear fuel, pH of the solution, solubility of nuclide, existing anions in solution, etc., while physical parameters can include volume ratio of solution to spent nuclear fuel, agitation rate, temperature, etc.

In the following Table 1, kinds of major nuclides constituting the spent nuclear fuel, maximum oxidation number of the nuclides, and real oxidation number of the nuclides contained in the spent nuclear fuel are enclosed. Almost all of nuclides in the spent nuclear fuel are present in the form of oxide in the spent nuclear fuel wherein amounts of U, TRU (containing 0.9% of Pu) and other fission nuclides are about 95%, 1% and 4%, respectively. If any metal is combined with oxygen at its maximum oxidation state in a stoichiometric ratio, the metal oxide is very stable and is hardly dissolved even under oxidation conditions. However, if the metal oxide is formed by combining the metal with oxygen at an oxidation state lower than the maximum oxidation state, when such metal oxide is oxidized to higher oxidation state, it has a higher possibility of dissolution in the carbonate solution.

TABLE 1

| | Nuclide | | SF wt-%[a] | possible oxidation state[b] | O/M ratio in SF[c] | Oxidation state in SF | Possibility of dissolution[d] |
|---|---|---|---|---|---|---|---|
| Actinide | U | | 95.6 | 3, 4, 5, 6 | 2 | 4 | o |
| | TRU metals | Pu | 0.88 | 3, 4, 5, 6 | 2 | 4 | o |
| | | Np | 0.05 | 3, 4, 5, 6 | 2 | 4 | o |
| | | Am | 0.04 | 3, 4, 5, 6 | 2 | 4 | o |
| | | Cm | 0.002 | 3, 4 | 2 | 4 | x |
| FP | Alkaline metals | Cs | 0.26 | 1 | ~0.5 | ~0.5 | o |
| | Alkali-earth metals | Sr | 0.08 | 2 | 1 | 2 | x |
| | | Ba | 0.16 | 2 | 1 | 2 | x |
| | Lanthanides | La | 0.12 | 3 | 1.5 | 3 | x |
| | | Ce | 0.24 | 3, 4 | 2 | 4 | x |
| | | Nd | 0.40 | 3 | 1.5 | 3 | x |
| | Platinum group metals | Ru | 0.22 | 2, 3, 4, 6, 8 | — | (≦4) | o |
| | | Pd | 0.13 | 2, 4 | — | (≦4) | x |
| | | Tc/(Re) | 0.08 | 4, 6, 7 | — | (≦4) | o |
| | Other transition metals | Zr | 0.36 | 4 | 2 | 4 | x |
| | | Mo | 0.33 | 2, 3, 4, 5, 6 | ~2 | ~4 | o |

[a]"SF wt-%" refers to the percentage, by weight, of various elements present on average in spent nuclear fuel.
[b]Bold and underlined numerals refer to the oxidation state most commonly found in nature.
[c]"O/M ratio in SF" refers to the Oxygen: Metal ratio in spent nuclear fuel.
[d]"o" and "x" refer to "soluble" and "insoluble," respectively.

Solubility of a metal oxide in a solution is affected by conditions of the solution in contact with the metal oxide. The present invention endows desirable oxidation conditions to a target metal oxide of the spent nuclear fuel, of which oxidation stat is lower than its maximum oxidation state, in a highly alkaline carbonate solution with an oxidant, thereby allowing dissolution of the metal oxides. The nuclides present at an oxidation state lower than the maximum oxidation state in the spent nuclear fuel, which are known in published literature, include U, Pu, Np, Am, Cs and Tc, Mo, and the like. Since all the TRU and fission products in the spent nuclear fuel are originated from U oxides ($UO_2$). Pu, Np, Am, Cs and Tc, Mo or similar nuclides can be present in the form of $MO_2$ (M: metal), $M_2O_3$ or $MO_x$ (0<x<2), which has not more than +4 valence. Actual solubility of a nuclide oxide soluble in a carbonate solution is affected by various conditions, comprising: redox equilibrium potential for conversion of the nuclide oxide to higher oxidation state; affinity of the nuclide to ligands present in a solution in contact with the nuclide; and/or stability of the nuclide oxide structure. Accordingly, a theoretical estimation for the actual solubility is significantly difficult.

The oxidative dissolution mechanism of spent nuclear fuel has not yet properly investigated, however, the dissolution of $UO_2$ in a carbonate solution is known to occur as shown in below equation, and those of $PuO_2$ and $NpO_2$ are considered to have analogous behavior to $UO_2$. That is, it is well-known that $UO_2$ is dissolved at an oxidation number of +6 by a non-reversible process. Dissolution of $UO_2$ begins when a surface intermediate of $U^{+5}$ is formed, oxygen for converting $UO_2$ into $UO_3$ is supplied from water. Accordingly, a process for dissolution of $UO_2$ commonly known in the art is carried out through the following path:

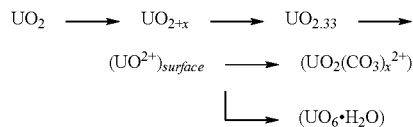

More particularly, when $UO_2$ is oxidized, the non-stoichiometric U oxide existing in grain boundaries is first oxidized, then followed by oxidation of $UO_2$ within grains into $UO_{2.33}$ (i.e., $U_3O_7$).

$UO_{2.33}$ is in mixture of $U^{6+}$ and $U^{4+}$ or $U^{5+}$ and $U^{4+}$, and $U^{4+}$ in the $UO_2$ decreases, as $UO_2$ changes into $UO_{2.33}$. When +5 valence within $UO_2$ is completely oxidized, the $UO_3$ is formed. When the $UO_3$ is in contact with acidic solution, $UO_2^{2+}$ ions are generated from its surface. On the other hand, when it is in contact with alkaline solution, $UO_2(OH)^{3+}$ ions are generated. Additionally, when the solution contains carbonate ions ($CO_3^{2-}$), complicated uranium carbonate complex ions ($UO_2(CO_3)_2^{2-}$, $UO_2(CO_3)_3^{4-}$) are formed. Likewise, cases of Np and/or Pu are considered to have similar carbonate complex ions. If the carbonate solution includes $H_2O_2$, U or Np or Pu is dissolved in the form of peroxocarbonate complex ions of $MO_2(O_2)_x(CO_3)_y^{2-2x-2y}$ (M: U, Np, Pu) and has relatively high solubility compared to uranium carbonate complexes generated without $H_2O_2$.

Redox Equilibrium Potential of Spent Nuclear Fuel Nuclides

As described above, in order to dissolve oxides of actinide nuclides (e.g., U, Pu, Np, Am, Cm, and the like) having a +4 valence, the actinide oxide with +4 valence must be oxidized into an oxide with +6 valence. Representative redox equations for these oxides with the equilibrium potential for each reaction are provided as follows:

$UO_2 + H_2O = UO_3 + 2H^+ + 2e^-$  $E_0 = 0.368 - 0.059$ pH;

$PuO_2 + H_2O = PuO_3 + 2H^+ + 2e^-$  $E_0 = 1.485 - 0.059$ pH;

$Np_2O_5 + H_2O = 2NpO_3 + 2H^+ + 2e^-$  $E_0 = 1.310 - 0.059$ pH;

$2NpO_2 + H_2O = Np_2O_5 + 2H^+ + 2e^-$  $E_0 = 1.253 - 0.059$ pH;

$Am_2O_3 + H_2O = AmO_2 + 2H^+ + 2e^-$  $E_0 = 0.42 - 0.059$ pH;

$2AmO_2 + H_2O = Am_2O_5 + 2H^+ + 2e^-$  $E_0 = 1.53 - 0.059$ pH; and $Am_2O_5 + H_2O = 2AmO_3 + 2H^+ + 2e^-$  $E_0 = 1.93 - 0.059$ pH.

Additionally, the redox equilibrium potentials of oxides of U, Pu, Np, and the like, can be determined using a Pourbaix Diagram. As shown, the equilibrium redox potential of a U oxide is different than the oxides of, e.g., Pu, Np, Am, and the like, these oxides having equilibrium redox potentials of 1.12 V, 0.942 V and 1.16 V, respectively. Accordingly, $UO_2$, having a U valence of +4, can be selectively oxidized to a U oxide having a valence state of +6, by conducting the reaction under controlled redox conditions. Selective oxidation of U enables formation of a U-carbonate complex having a high solubility in a carbonate solution. Therefore, U can be selectively dissolved from spent nuclear fuel comprising a mixture of U, Pu, Np, Am, and the like by selectively oxidizing U to provide a soluble oxo-complex of U.

When using a chemical oxidant for dissolving a spent nuclear fuel in a carbonate solution, secondary waste must not be generated. The chemical oxidant can include $K_2S_2O_8$, NaOCl, $H_2O_2$, etc. However, since $K_2S_2O_8$ and NaOCl can remain secondary waste of solid materials after dissolution of the spent nuclear fuel, the present invention uses $H_2O_2$ excluding the above two oxidants. Redox equilibrium potential characteristics of $H_2O_2$ acts as an oxidant for $UO_2$ while functioning as a reductant for other TRU oxides. $H_2O_2$ can be dissociated into $HO_2^-$ and the redox reaction between $H_2O_2$ and $HO_2^-$ is shown as follows:

Dissociation of $H_2O_2$:

$H_2O_2 = HO_2^- + H^+$

Figure 2:
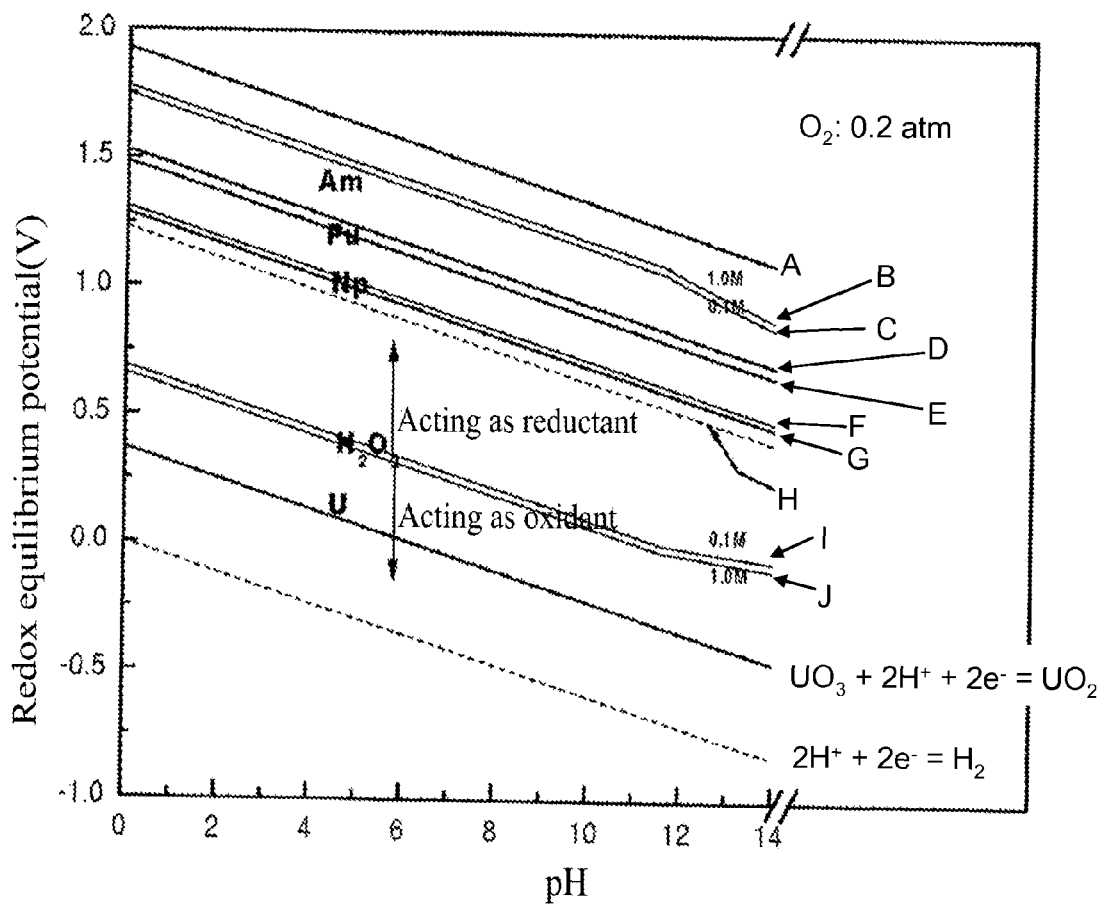
FIG. 2 is a graphic view showing redox equilibrium potential relations between $H_2O_2$ and actinide (U, Pu, Np, Am) oxides based on pH.

Reduction of $H_2O_2$:

$H_2O_2 + 2H^+ + 2e^- = 2H_2O$: pH<11.6; $E_0 = 1.78 - 0.059$ pH$+ 0.0295 \log [H_2O_2]$ $HO_2^- + 3H^+ + 2e^- = 2H_2O$: pH>11.6; $E_0 = 2.119 - 0.0886$ pH$+ 0.0295 \log [HO_2^-]$ Oxidation of $H_2O_2$:

$O_2 + 2H^+ + 2e^- = H_2O_2$: pH<11.6; $E_0 = 0.68 - 0.059$ pH$+ 0.0295 \log [P_{O2}/H_2O_2]$ $O_2 + 2H^+ + 2e^- = HO_2^-$: pH<11.6; $E_0 = 0.338 - 0.0295$ pH$+ 0.0295 \log [P_{O2}/HO_2^-]$ From the above redox equilibrium potential equations for an actinide oxide and $H_2O_2$, it is possible to depict a graphical view illustrating redox equilibrium potential relations between actinide oxides and $H_2O_2$, depending on pH, as shown in FIG. 2. When $H_2O_2$, U, and TRU oxides are co-present in an aqueous solution, $UO_2$—$UO_3$ equilibrium potential of U is lower than that of $H_2O_2$, so that $H_2O_2$ acts as an oxidant to $UO_2$ oxides. On the other hand, since $MO_2$-$MO_3$ equilibrium potential of Pu, Np and/or Am is higher than that of $H_2O_2$, $H_2O_2$ serves as a reductant to these $MO_2$ oxides. Consequently, the carbonate solution containing $H_2O_2$ does not generate secondary waste and neither of Pu, Np nor Am oxide contained in the spent nuclear fuel can be dissolved while U alone is selectively dissolved.

Dissolution-Leaching of U Alone From Spent Nuclear Fuel

Figure 3:
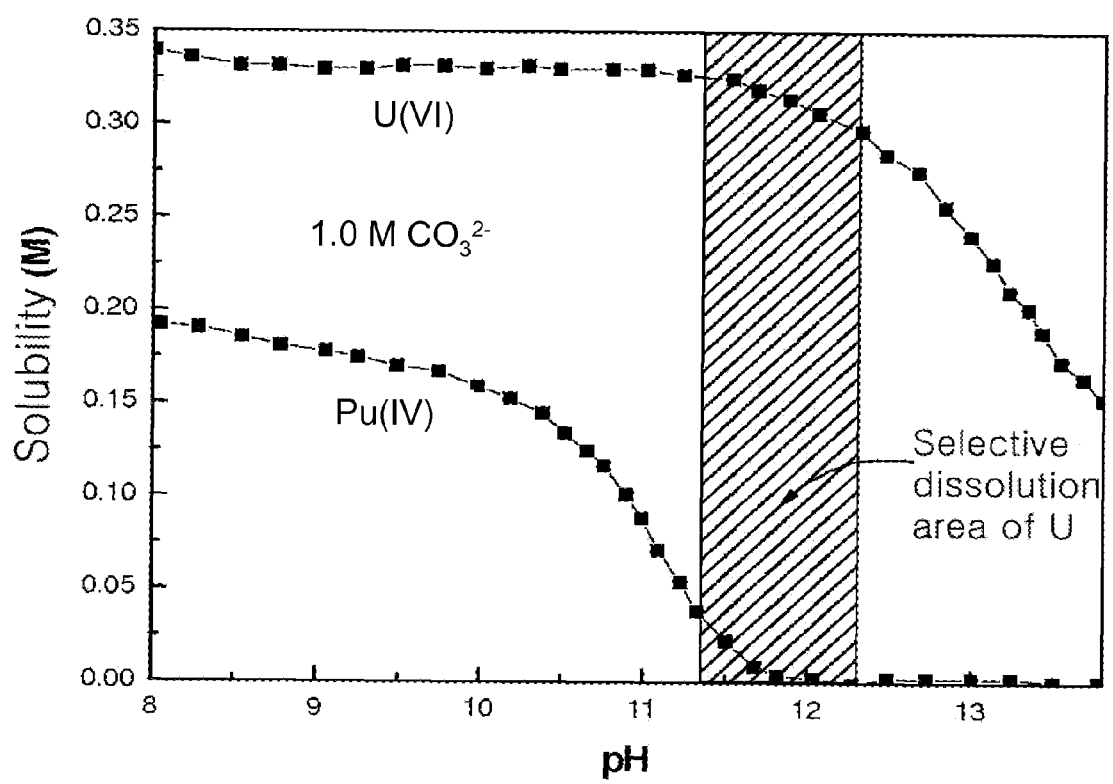
FIG. 3 is a graphic view showing pH-based solubility for each Pu(IV) and U(VI) to determine conditions for improving proliferation resistance when a spent nuclear fuel is dissolved in a carbonate solution used in the present invention.
Figure 4:
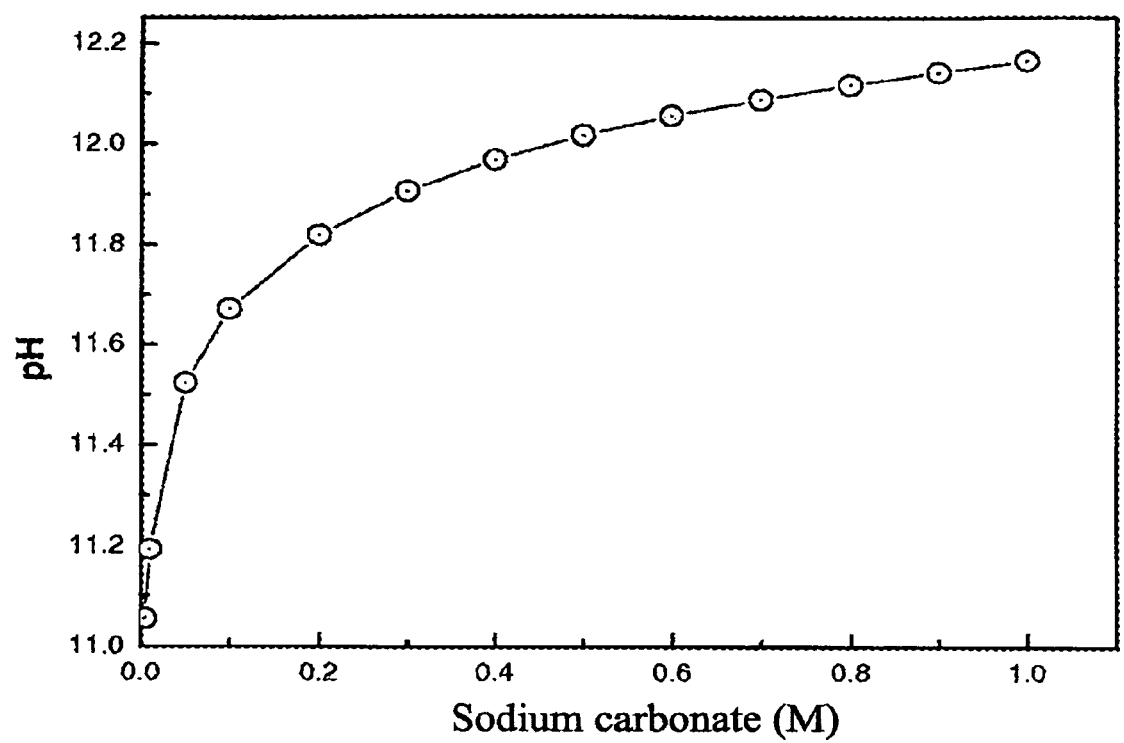
FIG. 4 is a graphic view showing pH calculation depending on concentration of a $Na_2CO_3$ carbonate solution.

As is apparent from the above description, as to dissolution of a spent nuclear fuel in a carbonate solution, a desired oxidant by which an U oxide is oxidized into +6 valence oxide while Pu, Nb and/or Am oxides are not oxidized into +6 valence oxide, must be added or an electrolytic oxidation potential can be applied so as to oxidize U alone into +6 valence oxide, and then, the U oxide of +6 valance form uranyl carbonate complex thereof. A dissolution rate of a nuclide in the spent nuclear fuel wherein the nuclide is released out of an oxide matrix in the spent nuclear fuel and converted into ions, can be affected by structural characteristics of the oxide as well as redox equilibrium potential and, at the same time, is influenced by solubility in a solution in contact with the spent nuclear fuel. FIG. 3 shows the solubilities of +6 valence U and +4 valence Pu in 1 M carbonate solution, which are theoretically calculated depending on pH, as disclosed in *Separation Science & Technology* 35:2127-2141 (2000). According to this document, +4 valance Pu has high solubility at not more than pH 11.5 due to formation of complex with carbonate ions, however, the solubility is near to 0 (zero) at this pH or more. In addition, $U^{+6}$ is combined with carbonate ions to form a complex and has high solubility at not more than pH 12.5. When using such solubility characteristics, if an oxidation condition for selectively dissolving U alone from a spent nuclear fuel in a carbonate solution at pH 11.5 to 12.5 is applied, Pu shows much lower solubility than U and, even if $Pu^{+4}$ is combined with carbonate ions and is dissolved, this Pu becomes a precipitate through hydrolysis. Therefore, Pu is substantially not present in the carbonate solution while U alone is included in the solution. FIG. 4 shows pH values of a carbonate solution which are calculated depending on concentration of $Na_2CO_3$. Herein, as to dissolution-leaching of U alone from the spent nuclear fuel, if the concentration of $Na_2CO_3$ is more than 0.1 M, the carbonate solution can maintain a pH 11.6 or more. Accordingly, it is expected that even if $Pu^{+4}$ is slightly dissolved from the $PuO_2$ in the carbonate solution during dissolution-leaching of U from the spent nuclear fuel, $Na_2CO_3$ must have a concentration of more than 0.1 M in order to attain desired pH at which such dissolved Pu is precipitated through hydrolysis.

Figure 5:
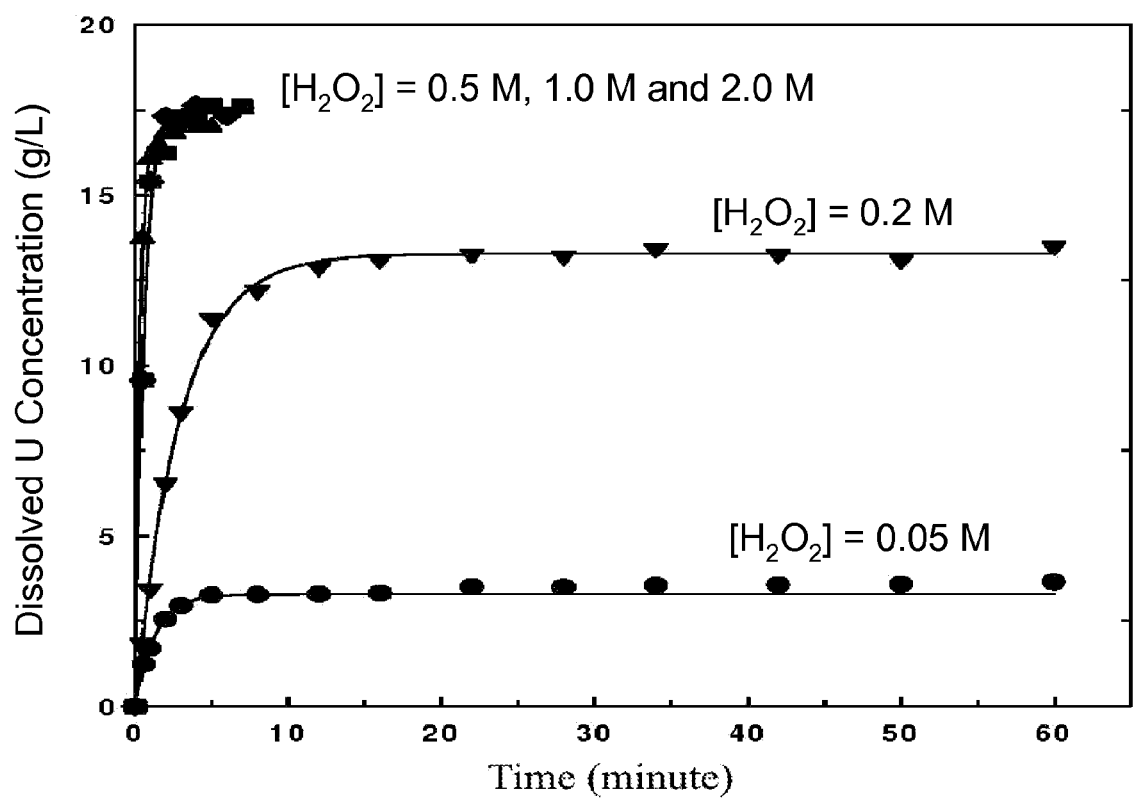
FIG. 5 is a graphic view illustrating an exemplary embodiment for oxidative dissolution of $UO_2$ in 0.5 M carbonate solution ($Na_2CO_3$) with different $H_2O_2$ concentrations.
Figure 6:
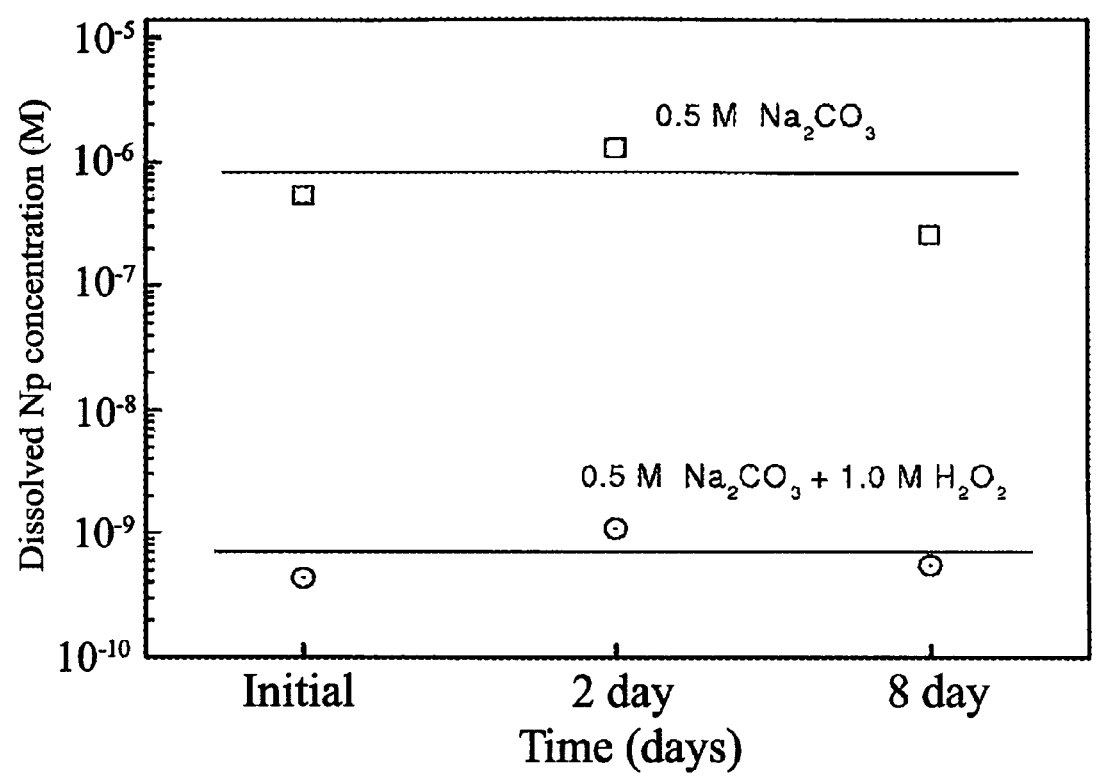
FIG. 6 is a graphic view illustrating an exemplary embodiment for oxidative dissolution of $NpO_2$ in 0.5 M carbonate solution ($Na_2CO_3$) with and without 1 M $H_2O_2$.

Although a direct dissolution experiment using a real spent nuclear fuel was not carried out, FIGS. 5 and 6 illustrate dissolution using $UO_2$ and $NpO_2$ for an exemplary embodiment of the present invention, respectively. FIG. 5 shows uranium concentration in a carbonate solution when 2 g of $UO_2$ is dissolved in 10 mL of 0.5 M $Na_2CO_3$ containing 0.05 M to 2 M $H_2O_2$. U is increasingly dissolved as the concentration of $H_2O_2$ becomes higher. For 0.5 M or more of $H_2O_2$, $UO_2$ is completely dissolved within 10 minutes. In the carbonate solution containing $H_2O_2$, U is dissolved in the form of uranium peroxo-carbonate complex $UO_2(O_2)_x(CO_3)_y^{2-2x-2y}$, as described above. FIG. 6 shows Np concentration in a carbonate solution when a minute amount of $NpO_2$ is placed in 0.5 M $Na_2CO_3$ and in 0.5 M $Na_2CO_3$ containing 1 M $H_2O_2$. In this case, insoluble $NpO_2$ particles are continuously observed in the solution and the Np concentration in the carbonate solution means the Np solubility value in the solution. If the solution does not include $H_2O_2$, the solubility of Np is about $10^{-6}$ M. When the solution contains $H_2O_2$, it is observed that the solubility was about $10^{-9}$ M and Np concentration varies little even 8 days after dissolution. Not being bound by any particular theory, the reason behind this result is that $H_2O_2$ functions as a reductant to $NpO_2$ so as to prevent dissolution of $NpO_2$ while acting as an oxidant to $UO_2$, as illustrated in FIG. 2. From results shown in FIGS. 5 and 6, although U is completely dissolved by $H_2O_2$, Np has a very low solubility and shows no progress in dissolution. Furthermore, among TRU nuclide oxides such as $PuO_2$, $NpO_2$ and/or $AmO_2$, in particular, $NpO_2$ has the lowest oxidation potential. Therefore, $PuO_2$ or $AmO_2$ in a carbonate solution with the same $H_2O_2$ conditions as $NpO_2$ is dissolved a little less. Accordingly, it is presumed that a concentration of Pu or Am is lower than Np concentration in the carbonate solution. Therefore, in the carbonate solution under the above disclosed conditions, a dissolution leaching ratio ($D_U/D_{TRU}$) of U to TRU nuclide oxides from a spent nuclear fuel can be $10^8$ to $10^9$. Consequently, using a carbonate solution containing $H_2O_2$, proliferation resistance is enhanced and U alone can be oxidatively leached from the spent nuclear fuel.

Leaching-Precipitation of U and Circulation of Carbonate

FIGS. 7-14 illustrate a series of exemplary embodiments in order to prove technical effects and reasonable features of the present invention. Kinds and concentrations of nuclide species used herein were selected on a basis of the major nuclides existing in a spent nuclear fuel with 33,000 MWd/Mt burn-up, which was calculated by ORIGEN Code, and the selected nuclides were used with their concentration ratios in the spent nuclear fuel for each of the embodiments.

Figure 7:
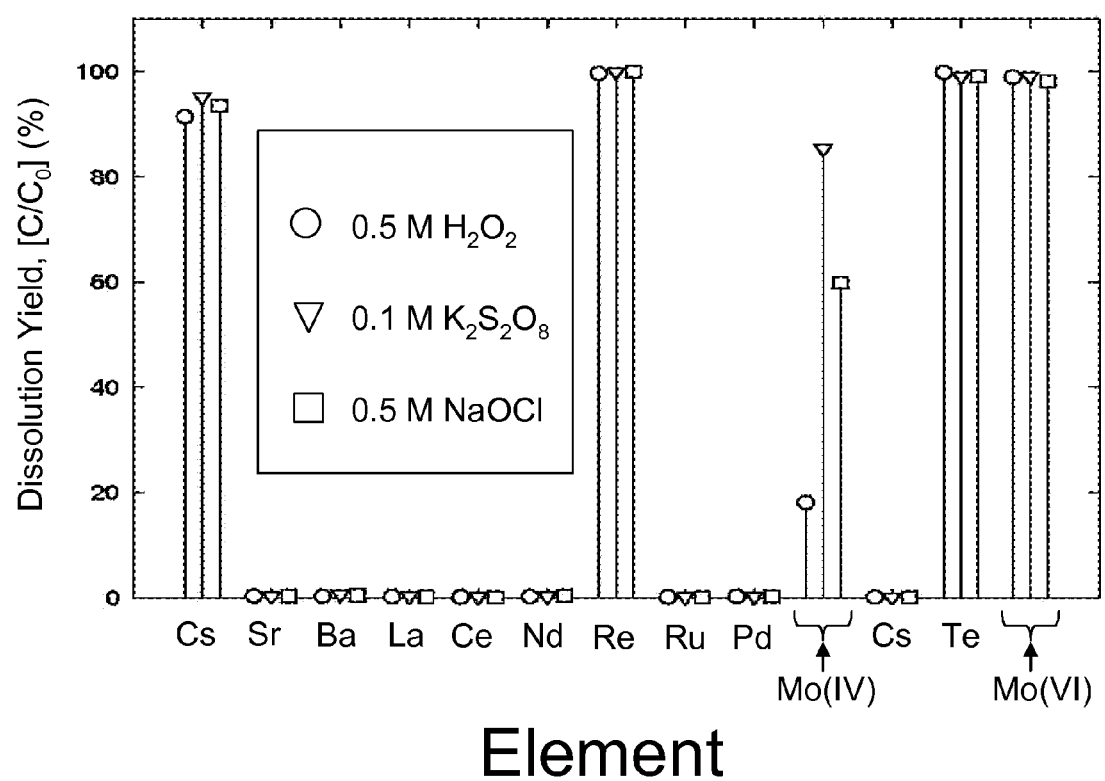
FIG. 7 is a graphic view illustrating an exemplary embodiment for oxidative dissolution of various nuclides in a 0.5 M carbonate solution ($Na_2CO_3$) depending on various oxidants.
Figure 8:
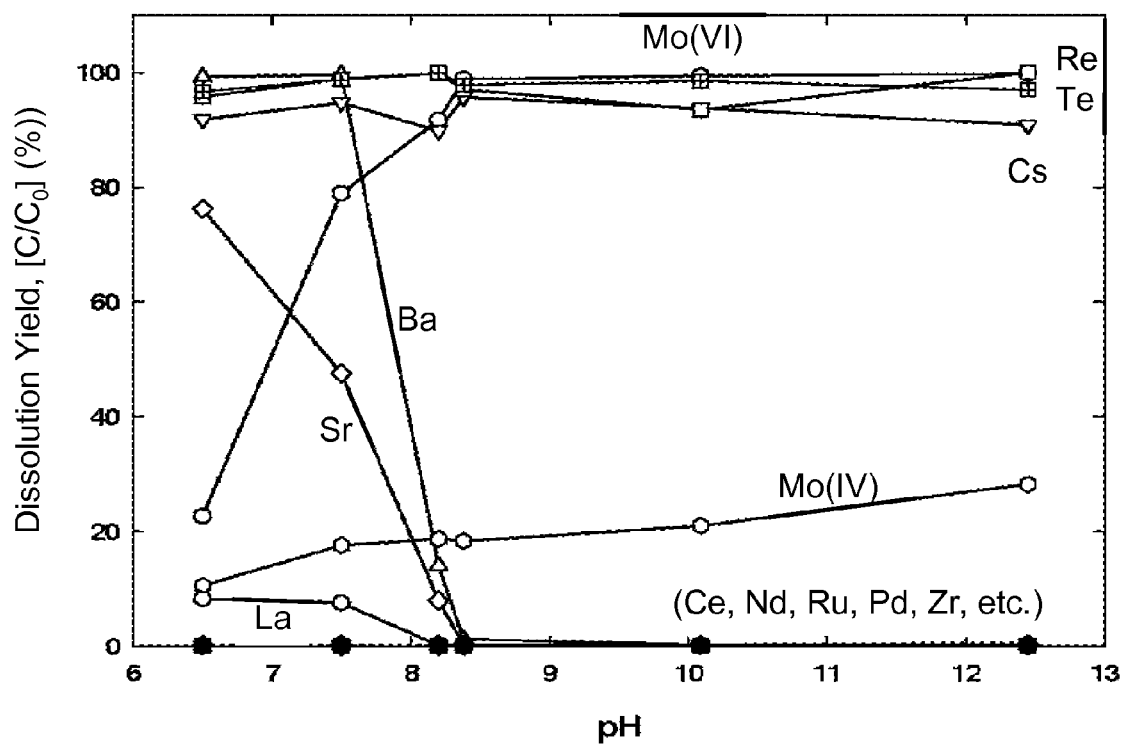
FIG. 8 is a graphic view illustrating an exemplary embodiment for oxidative dissolution of various nuclides depending on the pH of a 0.5 M carbonate solution ($Na_2CO_3$) containing 0.5 M $H_2O_2$.

FIGS. 7 and 8 illustrate dissolution yields of the selected nuclides of the spent nuclear fuel except U and TRU, in one case that the nuclide was dissolved in the form of $MO_2$ in 0.5 M $Na_2CO_3$ solution (about pH 12) for 2 hours and in another case that the pH of the $Na_2CO_3$ solution was verified, respectively. In the same Figures, Re was used as a replacement for Tc. FIG. 7 illustrates that Cs, Re and Te were almost completely dissolved independent of kinds of oxidant. For Mo, +4 valence oxide had solubility depending on oxidants, especially, was least dissolved in $H_2O_2$. Whereas, +6 valence oxide was completely dissolved in all of oxidants Ba and Sr as alkali-earth metals, La, Ce and Nd as lanthanide nuclides, Ru and Pd as platinum group elements, and Zr as a transitional metal can not be dissolved in the carbonate solution. In FIG. 8 illustrating the dissolution yield of the examined elements with pH, Ba, Sr and La were soluble at pH 8 or less, however, were not dissolved at pH 9 or more. This means the nuclides tested in this embodiment are precipitated through hydrolysis at pH 9 or more, thus not being soluble in the carbonate solution.

Figure 9:
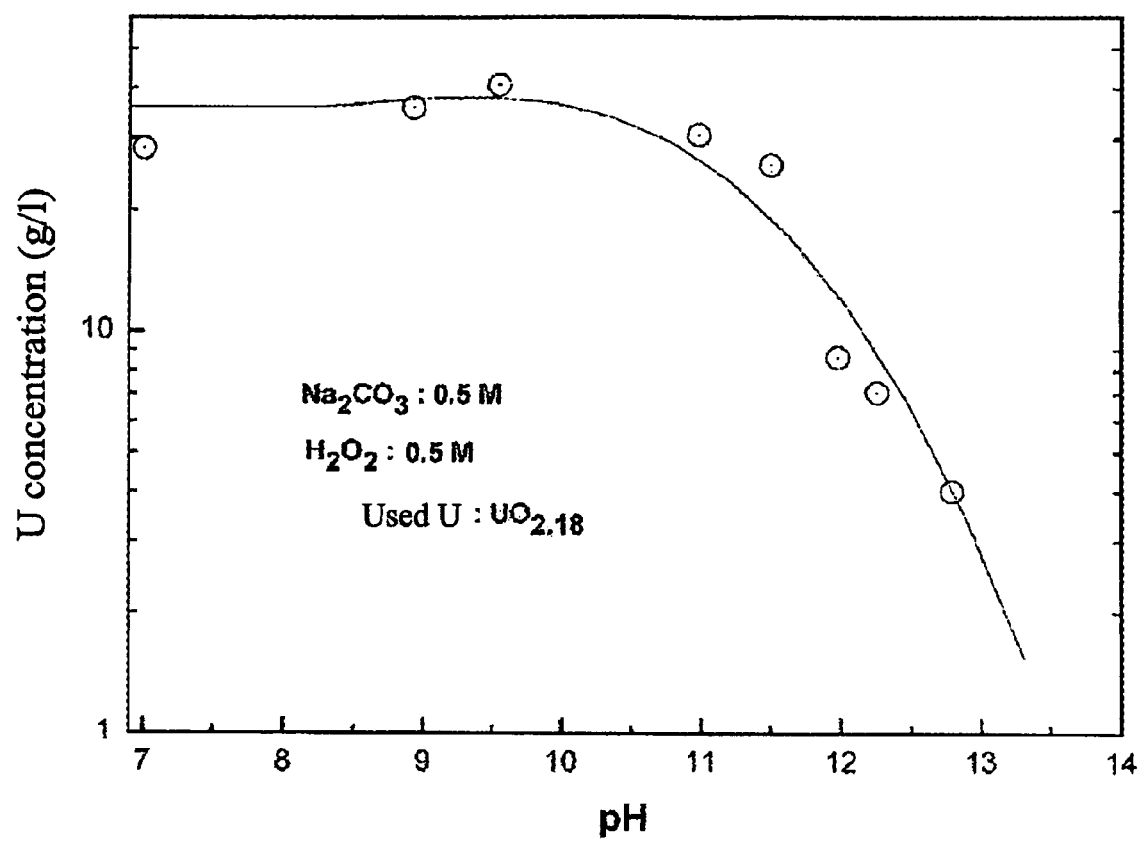
FIG. 9 is a graphic view illustrating an exemplary embodiment for oxidative dissolution of $UO_2$ depending on the pH of a 0.5 M carbonate solution ($Na_2CO_3$) containing 0.5 M $H_2O_2$.

FIG. 9 illustrates U concentration after dissolving $UO_{2.18}$ oxide in 0.5 M $Na_2CO_3$ solution containing 0.5 M $H_2O_2$ with pH. U is dissolved in the form of uranium peroxo-carbonate complex $UO_2(O_2)_x(CO_3)_y^{2-2x-2y}$. Similar to FIG. 3, illustrating theoretically calculated U concentration, it can be seen that the U concentration was maintained until pH 12 but started to rapidly reduce after the pH value. The reason why the U concentration is lower than that shown in FIG. 3, can be that an amount of $H_2O_2$ used in the embodiment illustrated in FIG. 9 is insufficient to dissolve U in the solution.

Figure 10:
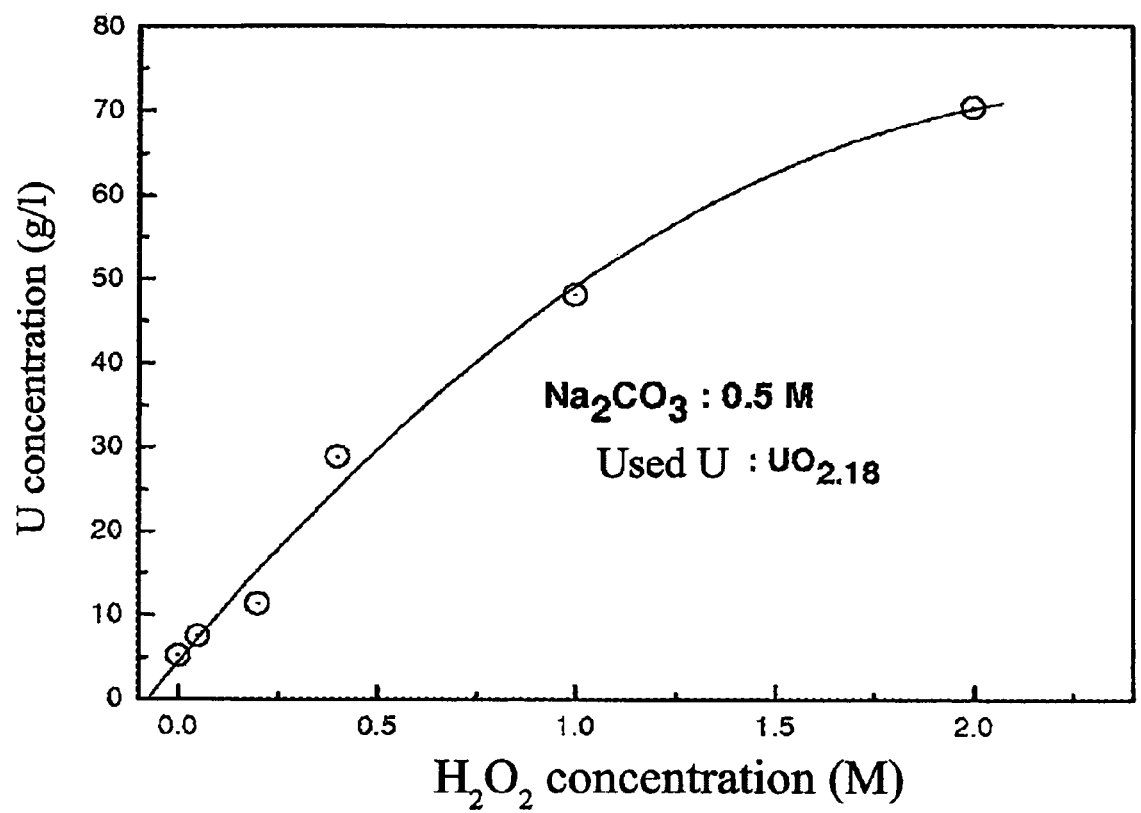
FIG. 10 is a graphic view illustrating an exemplary embodiment for oxidative dissolution of $UO_2$ depending on $H_2O_2$ concentration of 0.5 M carbonate solution ($Na_2CO_3$)

FIG. 10 illustrates U solubility in 0.5 M $Na_2CO_3$ solution with $H_2O_2$ concentration. For 2 M $H_2O_2$, the U solubility was similar to theoretically calculated U solubility illustrated in FIG. 3. As illustrated in FIG. 7, for 2 M $H_2O_2$, Cs, Re(/Tc) and Mo were dissolved, but Ba, Sr, La, Ce, Nd, Ru, Pd, Zr nuclides were not dissolved. As illustrated in FIG. 2, from the facts that $H_2O_2$ serves as an oxidant to $UO_2$ while acting as a reductant to $PuO_2$, $NpO_2$, $AmO_2$, etc., and that $Na_2CO_3$ solution of 0.1 M or more with $H_2O_2$ has pH 11.6 or more; and, from the results provided in FIGS. 2-10, it was observed that a great amount of U could be rapidly leached from spent nuclear fuel, additionally, some nuclides including Cs, Tc, Mo and Te as impurities in 0.2 M or more $Na_2CO_3$ solution containing 0.5 M to 2 M $H_2O_2$, the TRU nuclides being insoluble.

Among Cs, Tc, Mo and Te dissolved together with U in the carbonate solution, in particular, Cs is a major heat-generating nuclide and Tc has high mobility in underground waste disposal environments so that they are representative detrimental nuclides for disposal of high level radioactive waste.

Figure 11:
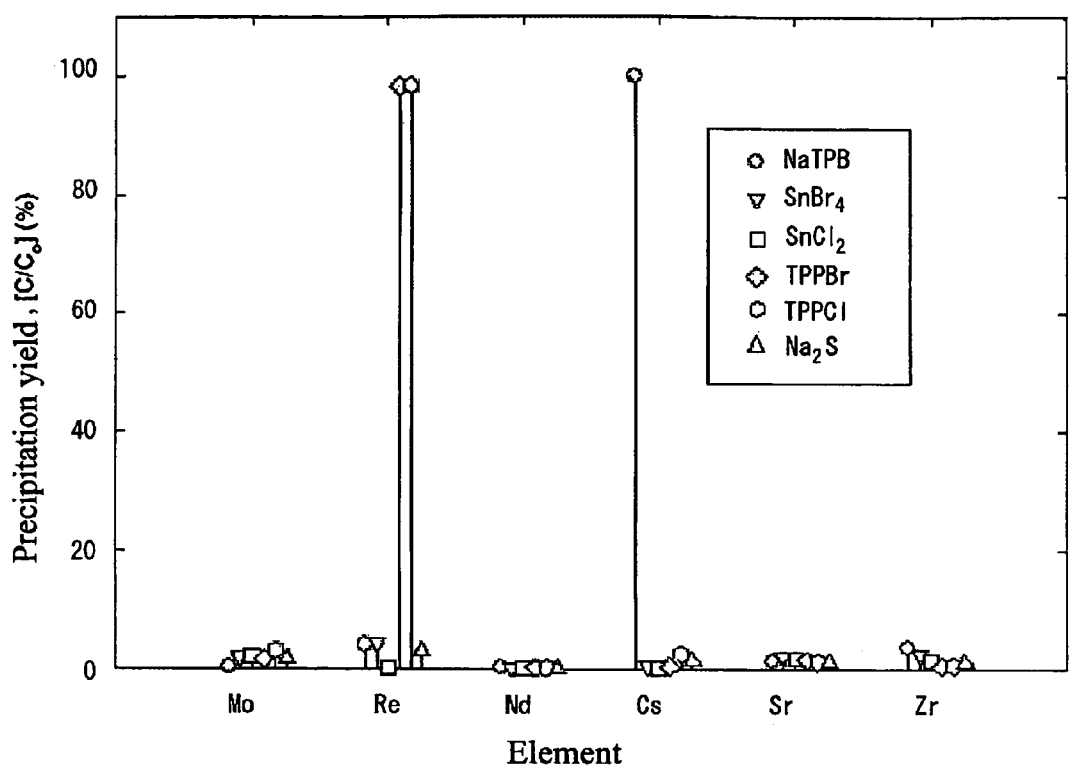
FIG. 11 is a graphic view illustrating an exemplary embodiment for precipitation of Cs and Re in 0.5M carbonate solution ($Na_2CO_3$) containing 0.5 M $H_2O_2$, depending on various precipitants.

Therefore, these elements need to be removed together with TRU nuclides. FIG. 11 illustrates an exemplary embodiment for precipitation of some nuclides in a carbonate solution containing, both organic precipitants, NaTPB and TPPCI. NaTPB precipitates only Cs and TPPCI precipitates only Tc. Therefore, adding NaTPB or TPPCI precipitant to the carbonate solution containing U as well as Cs and Tc, Cs and Tc alone can be selectively precipitated and removed.

Figure 12:
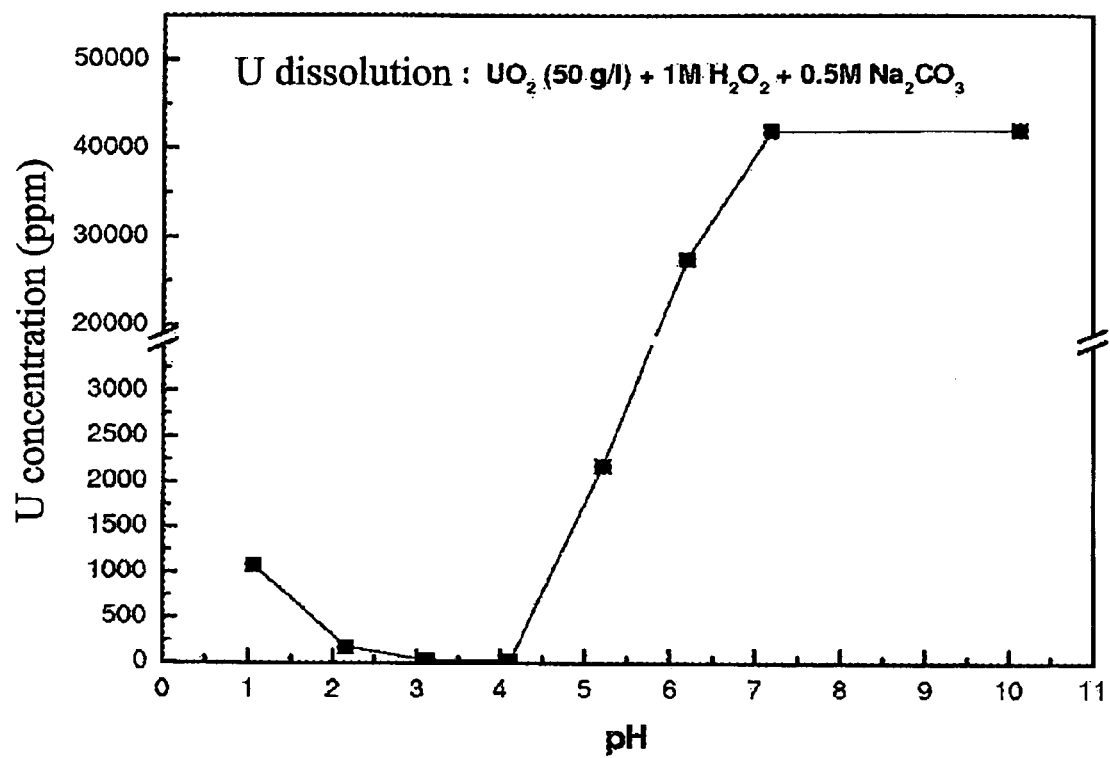
FIG. 12 is a graphic view illustrating an exemplary embodiment for measurement of U concentration in solution after precipitation of U in 0.5 M carbonate solution ($Na_2CO_3$) containing 1 M $H_2O_2$, depending on pH in the U solution.

From the carbonate solution containing U, Mo and Te without Cs and Tc at a pH of about 11 to about 13, U can be precipitated in the form of $UO_4$ by reducing the pH of the U-containing solution to a pH of about 2 to about 4. FIG. 12 illustrates the U concentration measured according to an exemplary embodiment when pH of the solution is reduced by using nitric acid ($HNO_3$) after $UO_2$ (in term of U: 50 g/l) was completely dissolved in 0.5 M $Na_2CO_3$ solution containing 1 M $H_2O_2$. When the pH value of the carbonate solution containing U was decreased to a pH of about 6 or less, carbonate ions in the solution began to undergo decarbonation and were converted into carbon dioxide while precipitating U. At a pH of about 2 to about 4, the precipitation reaches the highest level, and the U concentration of the solution becomes less than 1 ppm. A concentration of carbonate in the solution can substantially reach a level of about 0 (zero).

After drying the precipitated U, XRD analysis was performed to observe $UO_2 \cdot 4H_2O$, which determined that the U precipitates were in the form of $UO_4$. It is well known that solubility product ($K_{sp}$) of $UO_4$ is $\leq 10^{-3}$, or much lower, and this can explain why the U concentration in the solution was less than 1 ppm at a pH of about 2 to about 4. It was further observed that Mo and Te that can also be present in the U-containing carbonate solution are not precipitated upon decreasing the pH of the U-containing solution. Accordingly, U dissolved in the form of uranium peroxo-carbonate complex $UO_2(O_2)_x(CO_3)_y^{2-2x-2y}$ is high efficiently precipitated and recovered to more than 99.9% by adjusting the pH value to about 2 to about 4.

Referring to FIG. 12, illustrating an exemplary embodiment, adding an acid to a carbonate solution containing U in order to decrease pH to less than 4, $CO_3^{2-}$ in the complex $UO_2(O_2)_x(CO_3)_y^{2-2x-2y}$ as well as free $CO_3^{2-}$ which was not combined with U can be converted into $CO_2$ gas and discharged out of the solution. In order to recover this $CO_2$ gas, an output line for $CO_2$ gas generated from a U precipitation tank is connected to a bottom part of a gas absorption column provided outside the U precipitation tank, while an external NaOH solution is introduced into a top part of the gas absorption column wherein the carbon dioxide gas is converted into a liquid carbonate through gas-solid contact, so that about more than 99% of the carbonate can be recovered. As shown in FIG. 1, it was found that U precipitation and carbonate recovery are simultaneously performed. If acid is directly added to the solution to reduce pH of the carbonate solution containing U, because the amount of necessary proton ions is required to be 2 times bigger than that of carbonate ions used in the U dissolution step in order to completely titrate the carbonate solution, a great amount of acid is necessary. Accordingly, the solution remaining after U precipitation at pH 2 to 4 includes cations of the carbonate solution used in the U dissolution-leaching step and anions of the acid used in the U precipitation step in great quantities (for the exemplary embodiment illustrated in FIG. 12, 1 M $Na^+$ and 1 M $NO_3^-$ are present in the solution), so that a massive current is required to recover these ions in the acid-alkali recovery step using an electrodialysis method shown in FIG. 1.

Figure 13:
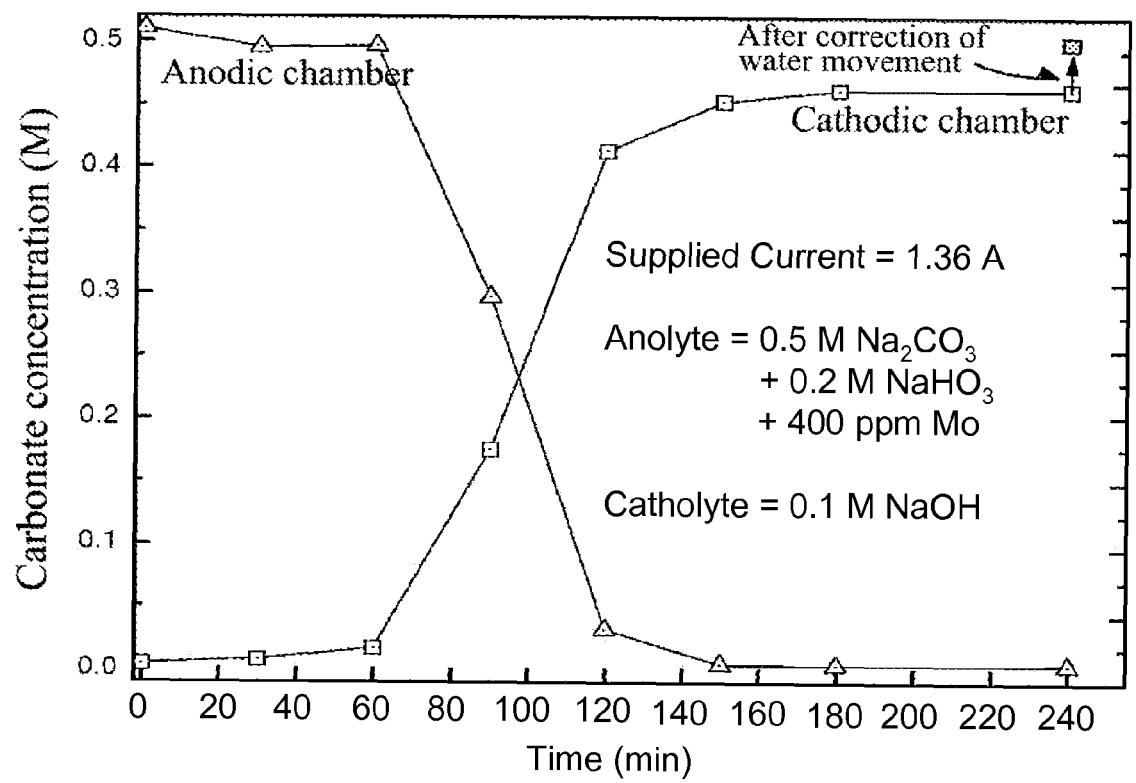
FIG. 13 is a graphic view illustrating an exemplary embodiment for electrolytic recovery of carbonate in an electrolyzer with a cation exchange membrane.

Using $H^+$ ions generated by water splitting reaction occurring in an anodic chamber when an electrolyzer equipped with a cation exchange membrane for U precipitation, the present invention can reduce pH of the carbonate solution containing U. FIG. 13 illustrates measured results of variation in concentrations of the carbonate in a cathodic chamber and an anodic chamber, when the carbonate solution containing U, which is the same as illustrated in FIG. 12, is introduced to the anodic chamber of the electrolyzer equipped with the cation exchange membrane of NAFION® 424 (E.I. DuPont de Nemours and Co., Wilmington, Del.) and 80 mA/cm² of electric current being applied thereto, and a line for discharging the gas from the anodic chamber is connected to a bottom end of a $CO_2$ gas absorption column mounted outside the electrolyzer and a cathodic solution of initial 0.1 M NaOH is introduced to a top end of the $CO_2$ gas absorption column. When the U containing carbonate solution introduced to the anodic chamber is acidified by water splitting reaction occurring in the anodic chamber, U in the solution precipitates and the carbonate ions are discharged in the form of $CO_2$ gas. Herein, electrical conductivity of the anodic solution is drastically decreased to cause an increase in cell voltage. In order to prevent such a condition, in the exemplary embodiment illustrated in FIG. 13, a 0.2M $NaNO_3$ supporting electrolyte mixture was added to the U containing carbonate solution before the solution was introduced to the anodic chamber. In the same embodiment, if the anodic chamber becomes less than pH 6 at 120 minutes after the electrolysis starts, the carbonate concentration of the anodic solution is substantially 0 (zero) and U is precipitated in the form of $UO_4$ in the anodic chamber by the same mechanism as illustrated in FIG. 12. After $CO_2$ gas is exhausted out of the anodic chamber, the remaining $Na^+$ ions move to the cathodic chamber through the cation exchange membrane to maintain the electrical neutrality and $OH^-$ ions are generated by water splitting reaction in the cathodic chamber so that a high concentration NaOH solution can be spontaneously produced in the cathodic chamber. This NaOH solution of more enhanced concentration reacts with $CO_2$ gas from the anodic chamber within the gas absorption column to produce $Na_2CO_3$ solution, thereby recovering the carbonate salt solution to be reused in the U dissolution-leaching step. When $Na^+$ ions of anodic solution pass through the cation exchange membrane, about 10% of water present in the anodic chamber moves to the cathodic chamber as well due to osmosis phenomena. Referring to FIG. 13, in consideration of the amount of water moved from the anodic chamber to the cathodic chamber during electrolysis in the cathodic chamber, it is found that more than 99% of carbonate in the anodic chamber can be recovered in the cathodic chamber. Such recovered $Na_2CO_3$ solution is recycled to the uranium leaching-dissolution tank shown in FIG. 1. In the anodic chamber, the solution remaining after the solution reached a pH of about 2 to about 4 and U was precipitated, substantially contains a reduced amount of ions compared to the solution treated by direct acid addition for U precipitation as illustrated in FIG. 12 (for the embodiment of FIG. 13, about 0.2 M $Na^+$ and 0.2 M $NO_3^-$ are remaining in the solution), thereby requiring a relatively reduced amount of electric current in recovering these ions in the acid-alkali recovery step illustrated in FIG. 1.

Figure 14:
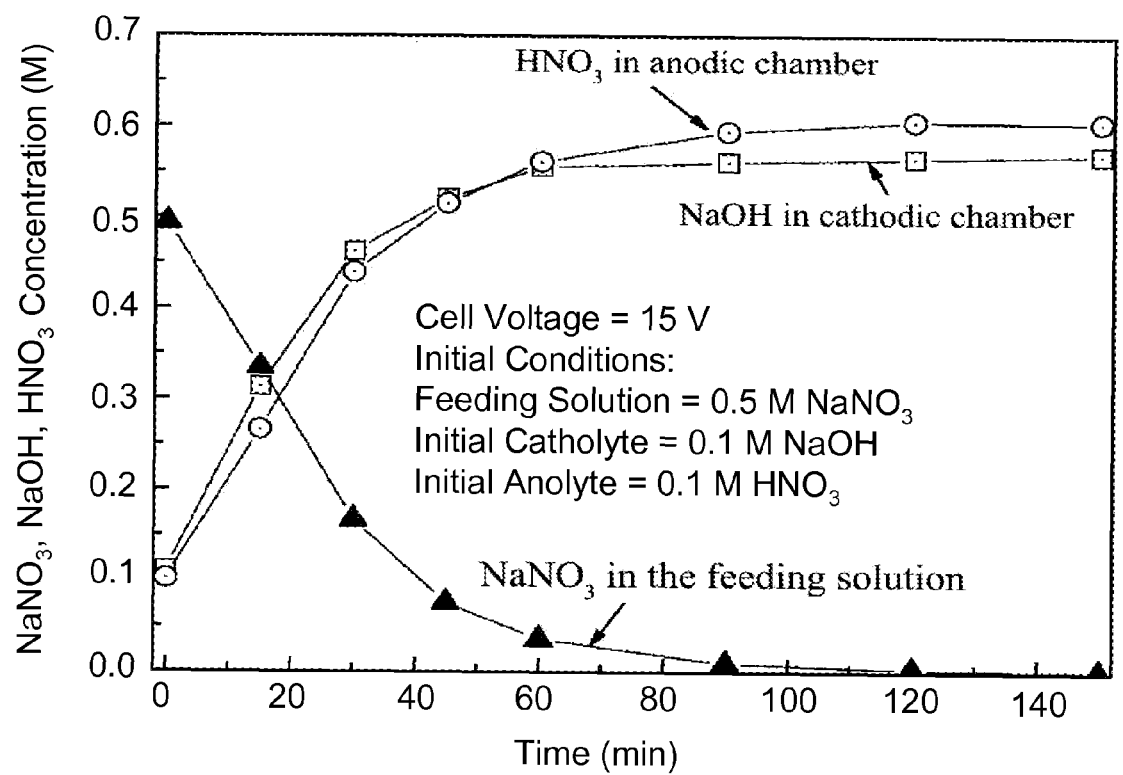
FIG. 14 is a graphic view illustrating an exemplary embodiment for acid-alkali recovery using an electrodialysis reactor having a cation exchange membrane and an anion exchange membrane.

FIG. 14 illustrates an exemplary embodiment for recovery of acid and alkaline solutions from the solution containing cation and anion generated from the alkaline and acid solutions used in U precipitation-carbonate recovery step by an electrodialysis reactor which is equipped with an anion exchange membrane at a cathode side and a cation exchange membrane at an anode side, separation of Mo and Te ions, which are finally remaining metal ions in the solution in U precipitation-carbonate recovery step, from the solution. The anion and cation in the solution used in this exemplary embodiment are $NO_3^-$ and $Na^+$ because $HNO_3$ was used as acid and NaOH was used as alkali in the U precipitation-carbonate recovery step. Accordingly, a $NaNO_3$ solution is used in this exemplary embodiment to verify the recovery of and alkaline solutions from the $NaNO_3$ solution.

More particularly, 100 mL of 0.5 M $NaNO_3$ solution was recycled between the cation exchange membrane and the anion exchange membrane of the electrodialysis reactor. Also, an initial 0.1 M NaOH solution and 0.1 M $HNO_3$ solution are circulated in the cathodic chamber and the anodic chamber, respectively, while applying cell voltage of 15V. The measured concentrations of $HNO_3$, NaOH and $NaNO_3$ in the anodic chamber, the cathodic chamber and the supplied solution, respectively, are shown in FIG. 14. It can be seen that $Na^+$ and $NO_3^-$ ions in the solution supplied between both ion exchange membranes move in the cathodic chamber and the anodic chamber, respectively, which in turn, can be regenerated in the forms of 0.5 M $HNO_3$ and 0.5 M NaOH by water splitting reactions occurring at both electrodes. The acid and alkali used herein can be recycled to be used in the U precipitation-carbonate recovery step. Mo and Te impurities cannot pass through the ion exchange membrane but remains in the solution, thus being discharged out of the solution.

As is apparent from the above description, unit experiments of the process illustrated in FIG. 1 and various characteristics in view of aquatic chemistry demonstrated that the disclosed technical concepts in regard to dissolution, leaching, precipitation and/or electrolytic carbonate and acid-alkali recovery using a highly alkaline carbonate solution system according to the present invention can achieve superior advantages over conventional methods in the art, in that U alone is selectively dissolved in the carbonate solution while being co-precipitated together with TRU oxides and other fission products from a spent nuclear fuel, thus recovering U alone from the fuel. Additionally, substantially no waste generation is observed during the above process.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A process for recovering uranium (U) alone from a spent nuclear fuel using a highly alkaline carbonate solution, the process comprising:
   (a) placing a spent nuclear fuel comprising U and at least one Transuranium (TRU) nuclide in a solution comprising carbonate and $H_2O_2$ at a pH of about 11 to about 13 to provide a U-containing carbonate solution, wherein the solution dissolves and leaches the U without dissolving or leaching a TRU nuclide present in the spent nuclear fuel;
   (b) precipitating at least one of cesium (Cs), technetium (Tc), or a combination thereof from the U-containing carbonate solution by adding an organic precipitant to the U-containing carbonate solution;
   (c) adjusting a pH of the U-containing carbonate solution to about 2 to about 4, wherein the adjusting precipitates and separates U from the U-containing carbonate solution in the form of $UO_4$, and a carbonate salt is recovered during the adjusting by flowing carbon dioxide gas generated during the adjusting into a gas absorption column in which an alkaline solution is circulated; and
   (d) separating an impurity nuclide partially co-dissolved with U in the U-containing carbonate solution by electrodialysis using a cation exchange membrane and an anion exchange membrane to recover the carbonate solution, wherein the impurity nuclide is selected from: molybdenum (Mo), tellurium (Te), and combinations thereof.

2. The process according to claim 1, wherein the carbonate solution in
   (a) comprises a metal carbonate in a concentration of about 0.1 M to about 3 M, and $H_2O_2$ in a concentration of about 0.1 M to 3 M.

3. The process according to claim 1, wherein the U in (a) is dissolved and leached in the form of $(UO_2(O_2))_x(CO_3^{2-})_y^{2-2x-2y}$.

4. The process according to claim 1, wherein (b) comprises precipitating the Cs as a sodium tetraphenyl borate salt (NaTPB) and precipitating the Tc as a tetraphenyl phosphonium chloride salt (TPPCI).

5. The process according to claim 1, wherein (c) comprises installing a gas absorption column outside a U precipitation tank, flowing carbon dioxide gas generated during the adjusting from the U-containing carbonate solution into a bottom part of the gas absorption column, and introducing an alkaline solution to a top part of the gas absorption column to convert the carbon dioxide gas into a carbonate solution.

6. The process according to claim 1, wherein (c) comprises at least one of:
   controlling a pH the carbonate solution by directly adding acid to the U-containing carbonate solution; or
   mixing the U-containing carbonate solution with about 0.1 M to about 0.3 M of a supporting electrolyte in an anodic chamber of an electrolyzer reactor having a cation exchange membrane and acidifying the U-containing carbonate by water splitting reaction in the anodic chamber, wherein the alkaline solution circulated in the gas absorption column is provided by mixing a cation generated from the water splitting reaction in the anodic chamber passing through the cation exchange membrane with a hydroxyl ion generated from a water splitting reaction in a cathodic chamber passing through an anion exchange membrane of the electrolyzer reactor during electrolysis.

7. The process according to claim 1, wherein (d) comprises: after precipitating U from the U-containing carbonate solution, introducing the remaining carbonate solution into an electrodialysis reactor comprising a cation exchange membrane and an anion exchange membrane; and subjecting a solution obtained there from to the process of (c).

8. The process according to claim 1, wherein TRU nuclides are selected from: U, plutonium (Pu), neptunium (Np), americium (Am), californium (Cm), and combinations thereof.

9. The process according to claim 2, wherein the metal carbonate is selected from: $K_2CO_3$, $Li_2CO_3$, $Na_2CO_3$, and combinations thereof.

10. The process according to claim 5, wherein the alkaline solution includes a species selected from: NaOH, LiOH, KOH, and combinations thereof.

11. The process according to claim 6, wherein the supporting electrolyte includes a species selected from: $NaNO_3$, $LiNO_3$, $KNO_3$, $Na_2SO_4$, $Li_2SO_4$, $K_2SO_4$, and combinations thereof.

12. The process according to claim 6, wherein the alkaline solution includes a species selected from: NaOH, LiOH, KOH, and combinations thereof.

13. The process according to claim 6, wherein the cation is selected from: $Na^+$, $Li^+$, $K^+$, and combinations thereof.

14. The process according to claim 7, wherein the anion is selected from: $NO_3^-$ and $SO_4^{2-}$, and combinations thereof.

15. The process according to claim 7, wherein the cation is selected from: $Na^+$, $Li^+$, $K^+$, and combinations thereof.

16. The process according to claim 1, further comprising drying the $UO_4$.

17. The process according to claim 1, wherein the $UO_4$ has a purity of about 95% or greater.

18. A process for recovering uranium (U) alone from a spent nuclear fuel using a highly alkaline carbonate solution, the process comprising:
  (a) placing a spent nuclear fuel comprising U and at least one Transuranium (TRU) nuclide in a solution comprising about 1 M carbonate and $H_2O_2$ at a pH of about 11.5 to about 12.5 to provide a U-containing carbonate solution, wherein the solution dissolves and leaches the U as $U^{6+}$ without dissolving or leaching a TRU nuclide present in the spent nuclear fuel;
  (b) precipitating at least one of cesium (Cs), technetium (Tc), or a combination thereof from the U-containing carbonate solution by adding an organic precipitant to the U-containing carbonate solution;
  (c) adjusting a pH of the U-containing carbonate solution to about 2 to about 4, wherein the adjusting precipitates and separates U from the U-containing carbonate solution in the form of $UO_4$, and a carbonate salt is recovered during the adjusting by flowing carbon dioxide gas generated during the adjusting into a gas absorption column in which an alkaline solution is circulated; and
  (d) separating an impurity nuclide partially co-dissolved with U in the U-containing carbonate solution by electrodialysis using a cation exchange membrane and an anion exchange membrane to recover the carbonate solution, wherein the impurity nuclide is selected from: molybdenum (Mo), tellurium (Te), and combinations thereof.

\* \* \* \* \*